(12) United States Patent
Zhou et al.

(10) Patent No.: US 7,711,988 B2
(45) Date of Patent: May 4, 2010

(54) ARCHITECTURE SUPPORT SYSTEM AND METHOD FOR MEMORY MONITORING

(75) Inventors: Yuanyuan Zhou, Champaign, IL (US); Josep Torrellas, Champaign, IL (US); Pin Zhou, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 813 days.

(21) Appl. No.: 11/453,303

(22) Filed: Jun. 14, 2006

(65) Prior Publication Data

US 2007/0006047 A1  Jan. 4, 2007

Related U.S. Application Data

(60) Provisional application No. 60/690,729, filed on Jun. 15, 2005.

(51) Int. Cl.
G06F 11/00 (2006.01)
(52) U.S. Cl. ...................................................... 714/30
(58) Field of Classification Search .................... 714/42
See application file for complete search history.

(56) References Cited

U.S. PATENT DOCUMENTS

| | | | | |
|---|---|---|---|---|
| 5,787,474 A * | 7/1998 | Pflum | ........................... | 711/138 |
| 6,634,020 B1 * | 10/2003 | Bates et al. | ................... | 717/131 |
| 6,978,303 B1 * | 12/2005 | McCreesh et al. | ........... | 709/224 |
| 7,047,520 B2 * | 5/2006 | Moore et al. | ................. | 717/129 |
| 7,073,043 B2 * | 7/2006 | Arimilli et al. | ............... | 711/207 |
| 7,496,730 B2 * | 2/2009 | Wang et al. | .................. | 711/206 |
| 2003/0084375 A1 * | 5/2003 | Moore et al. | ................... | 714/34 |
| 2005/0097384 A1 * | 5/2005 | Uehara et al. | ................... | 714/1 |
| 2005/0155020 A1 * | 7/2005 | DeWitt et al. | ............... | 717/130 |
| 2008/0077780 A1 * | 3/2008 | Zingher | ...................... | 712/227 |

OTHER PUBLICATIONS

P. Zhou, F. Qin, W. Liu, Y. Y. Zhou, J. Torrellas, "iWatcher: Efficient Architectural Support for Software Debugging," Proceedings of the 31$^{st}$ Annual Inernational Symposium on Computer Architecture (ISCA '04), Jun. 19, 2004.
P. Zhou, F. Qin, W. Liu, Y. Y. Zhou, J. Torrellas, "iWatcher: Simple, General Architectural Support for Software Debugging," IEEE Computer Society, vol. 24, No. 6, Nov. 2004, pp. 50-56.
Y. Y. Zhou, P. Zhou, F. Qin, W. Liu. and J. Torrellas, "Efficient and Flexible Architectural Support for Dynamic Monitoring," ACM Transactions on Architecture and Code Generation (ACM-TACO). vol. 2, No. 1, Mar. 2005.
P. Zhou. W. Liu, L. Fei, S. Lu, F. Qin, Y. Y. Zhou, S. Midkiff, J. Torrellas, "AccMon: Automatically Detecting Memory-related Bugs via Program Counter-based Invariants", Proceedings of the 37th Annual IEEE/ACM Interntaional Symposium on Microarchitecture (MICRO '04), Dec. 4, 2004.

(Continued)

*Primary Examiner*—Nadeem Iqbal
(74) *Attorney, Agent, or Firm*—Greer, Burns & Crain, Ltd.

(57) ABSTRACT

Methods and systems for memory monitoring. A triggering access is detected at one or more monitored memory regions. When a triggering access is detected, a function is accessed for determining a monitoring function, and a monitoring function associated with a particular triggered memory location address is automatically determined.

34 Claims, 19 Drawing Sheets

OTHER PUBLICATIONS

J. Oplinger and M. S. Lam. Enhancing software reliability with speculative threads. In ASPLOS, Oct. 2002.

M. Prvulovic and J. Torrellas. ReEnact: Using thread-level speculation mechanisms to debug data races in multithreaded codes. In ISCA, Jun. 2003.

E. Witchel, J. Cates, and K. Asanovi'c. Mondrian memory protection. In ASPLOS, Oct. 2002.

M. Xu, R. Bodik, and M. D. Hill. A "flight data recorder" for enabling fullsystem multiprocessor deterministic replay. In ISCA, Jun. 2003.

M. D. Ernst, A. Czeisler, W. G. Griswold, and D. Notkin. Quickly detecting relevant program invariants. In International Conference on Software Engineering, 2000.

S. Hangal and M. S. Lam. Tracking down software bugs using automatic anomaly detection. In Proceedings of the International Conference on Software Engineering, May 2002.

A. Moshovos, G. Memik, B. Falsafi, and A. Choudhary. Jetty: Filtering snoops for reduced energy consumption in SMP servers. In Proceedings of the Seventh International Symposium on High Performance Computer Architecture (HPCA- 7), 2001.

J.-K. Peir, S.-C. Lai, and S.-L. Lu. Bloom filtering cache misses for accurate data speculation and prefetching. In Proceedings of the 16th Annual ACM International Conference on Supercomputing (ICS), 2002.

S. Sethumadhavan, R. Desikan, D. Burger, C. R.Moore, and S.W. Keckler. Scalable hardware memory disambiguation for high ILP processors. In Proceedings of the 36th Annual International Symposium on Microarchitecture (MICRO-36), Dec. 2003.

P. Zhou, F. Qin, W. Liu, Y. Y. Zhou, J. Torrellas, "iWatcher: Efficient Architectural Support for Software Debugging," Proceedings of the $31^{st}$ Annual Inemational Symposium on Computer Architecture (ISCA '04), Jun. 19, 2006.

P. Zhou, F. Qin, W. Liu, Y. Y. Zhou, J. Torrellas, "iWatcher: Simple, General Architectural Support for Software Debugging," IEEE Computer Society, vol. 24, No. 6, Nov. 2004, pp. 50-56.

Y. Y. Zhou, P. Zhou, F. Qin, W. Liu, and J. Torrellas, "Efficient and Flexible Architectural Support for Dynamic Monitoring," ACM Transactions on Architecture and Code Generation (ACM-TACO), vol. 2, NO. 7, Mar. 2005.

P. Zhou, W. Liu, L. Fei, S. Lu, F. Qin, Y. Y. Zhou, S. Midkiff, J. Torrellas, "AccMon: Automatically Detecting Memory-related Bugs via Program Counter-based Invariants".

* cited by examiner

| CPU frequency | 2.4GHz | ROB size | 360 |
|---|---|---|---|
| Fetch width | 16 | I-window size | 160 |
| Issue width | 8 | Int FUs | 6 |
| Retire width | 12 | Mem FUs | 4 |
| Ld/st queue entries | 32/thread | FP FUs | 4 |
| Spawn overhead | 5 cycles | Reaction mode | ReportMode |
| L1 cache | \multicolumn{3}{l|}{32KB, 4-way, 32B/line, 3 cycles latency} |
| L2 cache | \multicolumn{3}{l|}{1MB, 8-way, 32B/line, 10 cycles latency} |
| VWT | \multicolumn{3}{l|}{1024 entries, 8-way, 2B/entry} |
| LargeRegion | \multicolumn{3}{l|}{64Kbytes} |
| RWT | \multicolumn{3}{l|}{4 entries, 32bits for the start and end address} |
| Memory | \multicolumn{3}{l|}{200 cycles latency} |

FIG. 13

| Application | Bug Class | Type of Monitoring | Bug Description | Monitoring Function |
|---|---|---|---|---|
| gzip-STACK | stack smashing | general | In function "huft_free()", the return address in the program stack is corrupted. | When entering a function, call iWatcherOn() on the location holding the return address. Turn off monitoring immediately before the function returns. |
| gzip-MC | memory corruption | general | In function "huft_free()", dereference a pointer after it is freed up. | Monitor all freed locations. Any access to such locations is a bug. After a free buffer is re-allocated, the monitoring for the buffer is turned off. |
| gzip-BO1 | dynamic buffer overflow | general | In function "huft_build()", access an element past the boundary of the dynamically-allocated buffer. | Add some padding to all buffers. The padded locations are monitored by iWatcher. Any access to them is a bug. |
| gzip-ML | memory leak | general | In function "huft_free()", only free the first node of the linked list but not other nodes. | Monitor all accesses to heap objects. Each access to a heap object updates its time-stamp. Objects that have not been accessed for a long time are likely to be memory leaks. |
| gzip-COMBO | combination of bugs | general | Combination of the bugs in gzip-ML, gzip-MC, and gzip-BO1. | Combines the monitoring in gzip-ML, gzip-MC, and gzip-BO1. |
| gzip-BO2 | static array overflow | general | In function "huft_build()", write outside of a static array. | Similar to gzip-BO1. |
| gzip-IV1 | value invariant violation | program specific | In function "huft_build()", variable "hufts" is corrupted due to memory corruption. | Any write to this location triggers an invariant check. |
| gzip-IV2 | value invariant violation | program specific | In function "inflate()", an unusual value is stored into the variable "hufts". | Similar to gzip-IV1. |
| cachelib-IV | value invariant violation | program specific | In option.c:line 90, initialize variable "conf_algos" to 0. | Similar to gzip-IV1. |
| bc-1.03 | outbound pointer | program specific | In dc-eval.c:line 498-503, pointer "s" is outside of the array in some cases. | Use a "range_check()" function to check the value of "s" each time "s" is written. |

FIG. 14

| Application | Valgrind | | 1Watcher | |
|---|---|---|---|---|
| | Bug Detected? | Overhead (%) | Bug Detected? | Overhead (%) |
| gzip-STACK | No | - | Yes | 80.0 |
| gzip-MC | Yes | 1466 | Yes | 8.7 |
| gzip-BO1 | Yes | 1514 | Yes | 10.4 |
| gzip-ML | Yes | 936 | Yes | 37.1 |
| gzip-COMBO | Yes | 1650 | Yes | 42.7 |
| gzip-BO2 | No | - | Yes | 10.5 |
| gzip-IV1 | No | - | Yes | 10.5 |
| gzip-IV2 | No | - | Yes | 9.6 |
| cachelib-IV | No | - | Yes | 3.8 |
| bc-1.03 | No | - | Yes | 23.2 |

FIG. 15

| Application | % Time With > 1 Microthread | % Time With > 4 Microthreads | # Triggering Accesses per 1M Instructions | # iWatcher-On/Off() Calls | Size of iWatcherOn/Off() Call (Cycles) | Size of Monitoring Function (Cycles) | Max Monitored Memory Size at a Time (Bytes) | Total Monitored Memory Size (Bytes) |
|---|---|---|---|---|---|---|---|---|
| gzip-STACK | 0.1 | 0.0 | 0.2 | 4889642 | 20.7 | 22.4 | 40 | 19558568 |
| gzip-MC | 0.1 | 0.0 | 0.4 | 239 | 1291.3 | 24.4 | 246880 | 246880 |
| gzip-BO1 | 0.1 | 0.0 | 0.4 | 486 | 210.4 | 177.0 | 80 | 1944 |
| gzip-ML | 23.1 | 16.9 | 13008.9 | 243 | 582.6 | 47.4 | 6613600 | 6847616 |
| gzip-COMBO | 26.2 | 15.2 | 13009.6 | 243 | 1082.3 | 45.2 | 6847616 | 6847616 |
| gzip-BO2 | 0.1 | 0.0 | 0.2 | 880 | 59.0 | 24.8 | 32 | 3520 |
| gzip-IV1 | 0.1 | 0.0 | 0.7 | 132 | 40.5 | 21.7 | 4 | 528 |
| gzip-IV2 | 0.1 | 0.0 | 1.1 | 1 | 83.0 | 23.0 | 4 | 4 |
| cachelib-IV | 0.4 | 0.0 | 91.6 | 10 | 129.0 | 16.5 | 40 | 40 |
| bc-1.03 | 2.2 | 0.0 | 907.2 | 1 | 81.0 | 134.2 | 4 | 4 |

FIG. 16

ARCHITECTURE SUPPORT SYSTEM AND METHOD FOR MEMORY MONITORING

PRIORITY CLAIM

This application claims the benefit of U.S. Provisional Application Ser. No. 60/690,729, filed Jun. 15, 2005, under 35 U.S.C. §119.

BACKGROUND OF THE INVENTION

The invention relates generally to the fields of computers, hardware architecture, and software.

Software bugs and viruses are a major impediment to the operation of computers. Workflow problems are caused. Data is lost. Expenditures are made to address computer failures. These problems lead to significant expenses. The expenses incurred for software debugging with the widespread use of computers are a billion dollar economic problem, with businesses, schools, and government carrying a large load of the economic expenditures related to software debugging and computer operation.

Recent impressive improvements in computer architecture have not led to significant gains in ease of debugging and security. Software debugging and attack detection often rely on inserting run-time software checks. However, program execution typically slows down significantly, often by 10-100 times.

Despite costly efforts to improve software-development methodologies, software bugs in deployed codes continue to thrive, often accounting for as much as 40% of computer system failures, and 50-70% of security vulnerabilities. Software bugs can crash systems, making services unavailable or, in the form of "silent" bugs, corrupt information or generate wrong outputs. This lapse represents a major shortcoming in state-of-the-art microprocessors. Software bugs, especially memory-related bugs, are often exploited by malicious users to launch security attacks.

There are several approaches to debug codes to improve software robustness and security. One approach is to perform checks statically. Examples of this approach include explicit model checking and program analysis. Most static tools require significant involvement of the programmer to write specifications or annotate programs. In addition, most static tools are limited by aliasing problems and other compile-time limitations. This is especially the case for programs written in unsafe languages such as C or C++, the predominant programming languages in the art. As a result, many bugs often remain in programs even after aggressive static checking and are exploited for security attacks.

Another approach is to monitor execution dynamically. Many methods have been proposed for dynamic code monitoring. Dynamic monitoring can be generally classified into two categories: code-controlled monitoring (CCM) and location-controlled monitoring (LCM).

With CCM, monitoring is performed only at special points in the program. Two types of CCM are assertions and (most) dynamic checkers. Assertions are inserted by programmers to perform sanity checks at certain places. If the condition specified in an assertion is false, the program aborts. Assertions are one of the most commonly used methods for debugging. However, they can add significant overhead to program execution. Moreover, it is often hard to identify all the places where assertions should be placed.

Dynamic checkers are automated tools that detect common bugs at run time, with instrumentation inserted in the code that monitors invariants and reports violations as errors or alerts for attacks. The strength of this approach is that the analysis is based on actual execution paths and accurate values of variables and aliasing information.

For example, DIDUCE automatically infers likely program invariants, and uses them to detect program bugs. Others, such as Purify and Valgrind, monitor memory accesses to detect memory leaks and some simple instances of memory corruption, such as freeing a buffer twice or reading an uninitialized memory location. StackGuard can detect some buffer overflow bugs, which have been a major cause of security attacks. Another dynamic checker, Eraser, can detect data races by dynamically tracking the set of locks held during program execution. Such dynamic checker tools usually use compilers or code-rewriting tools such as ATOM, EEL, and Dyninst to instrument programs with checks.

Unfortunately, most dynamic checkers suffer from two general limitations. First, they are often computationally expensive. One major reason is their large instrumentation cost. Another reason is that dynamic checkers may instrument more places than necessary due to lack of accurate information at instrumentation time. As a result, some dynamic checkers slow down a program, e.g., by 6-30 times, which makes such tools undesirable for production runs. Moreover, some timing-sensitive bugs may never occur with these slowdowns. Additionally, such high overhead is not practical to use during production runs to detect security attacks.

Second, most dynamic checkers rely on compilers or preprocessing tools to insert instrumentation and, therefore, are limited by imperfect variable disambiguation. Consequently, particular accesses to a monitored location may be missed by these tools. Because of this, some bugs are caught much later than when they actually occur, which makes it hard to find the root cause of the bug. The following C code gives a simple example.

```
int x, *p;
                    /* assume invariant : x = 1 */
...
p = foo( );   /* a bug: p points to x incorrectly */
*p = 5;       /* line A: corruption of x */
...
InvariantCheck (x == 1);     /* line B */
z = Array(x);
...
```

While x is corrupted at line A, the bug is not detected until the invariant check at line B. This is because it may be hard for a dynamic checker to know that it needs to insert an invariant check after line A, due to the difficulty of performing perfect pointer disambiguation. Generally, dynamic checkers often suffer from hard-coded bug detection functionality, language specificity, and difficulty to work with low-level code.

With LCM, on the other hand, monitoring is associated directly with memory locations, and therefore all accesses to such memory locations are monitored. LCM has two advantages over CCM. First, LCM monitors all accesses to a watched memory location using all possible variable names or pointers, whereas CCM may miss some accesses because of pointer aliasing. Second, LCM monitors only those memory locations that truly access a watched memory location, while CCM may need to instrument at many unnecessary points due to the lack of accurate information at instrumentation time. Therefore, LCM can be used to detect both invariant violations and illegal accesses to a memory location, whereas it may be difficult and too expensive for CCM to check for illegal accesses.

Hardware-assisted watchpoints fall into the LCM category. For example, to assist software debugging, several state-of-the-art processor architectures such as Intel and Sun SPARC provide hardware support for watchpoints to monitor several programmer-specified memory locations. The hardware support is provided through a few special debug registers. When a watched memory location is accessed, the hardware triggers an exception that is handled by the debugger (such as gdb). It is then up to the programmer to manually check the program state using the debugger.

SUMMARY OF THE INVENTION

Preferred methods and systems for memory monitoring are provided. In a preferred method for memory monitoring, a triggering access is detected at one or more monitored memory regions. When a triggering access is detected, a function is accessed for determining a monitoring function, and a monitoring function associated with a particular triggered memory location address is automatically determined. The program execution jumps to the monitoring function efficiently without going through the operating system.

BRIEF DESCRIPTION OF THE DRAWINGS

FIG. 13 shows parameters of a simulated architecture for experiments using an exemplary monitoring and debugging support architecture;

FIG. 14 shows a list of bugs and associated monitoring functions, in an exemplary monitoring and debugging operation;

FIG. 15 shows a comparison of bug monitoring results for an exemplary monitoring and debugging operation according to an embodiment of the present invention, and for Valgrind, a dynamic checker;

FIG. 16 shows a characterization of execution for an exemplary monitoring and debugging operation;

DETAILED DESCRIPTION

Figure 1:
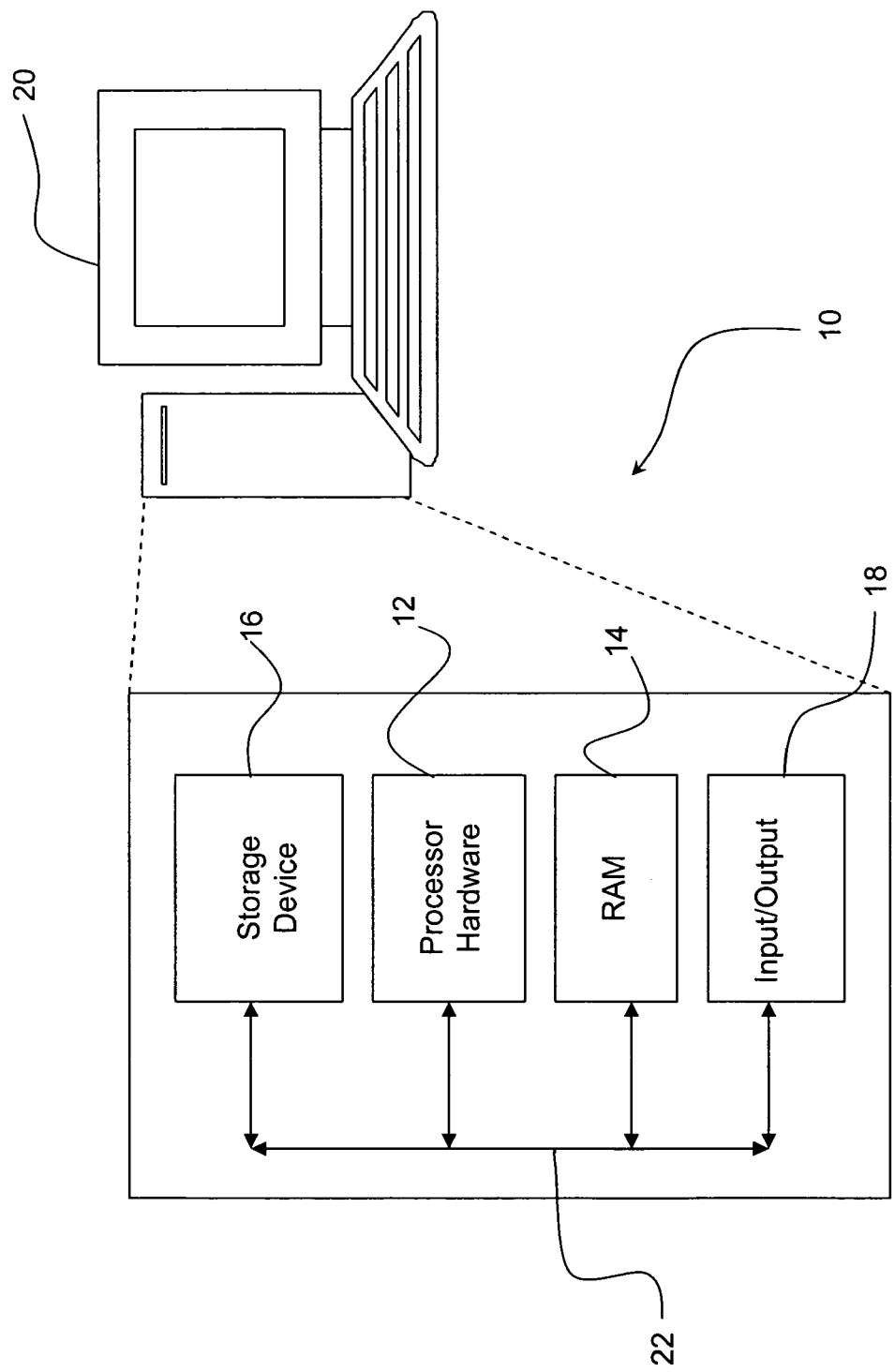
FIG. 1 shows a personal computer (PC) for use with a monitoring system in accordance with preferred embodiments of the present invention.

While watchpoints are a good starting point for supporting memory monitoring for debugging, they have several limitations. For example, watchpoints are designed to be used in an interactive debugger. For non-interactive execution monitoring, they are both inflexible and inefficient. As one reason, they trigger very expensive exceptions to the operating system every time a monitored location is accessed, and do not support low-overhead checks on variable values automatically. Since exceptions are expensive, it would be very inefficient to use them for dynamic memory monitoring during production runs for detecting software bugs and security attacks. As another reason, most architectures only support a handful of watchpoints (e.g., four in Intel x86). Therefore, it is difficult to use watchpoints for dynamic monitoring in production runs for bug and attack detection, which requires efficiency and watching many memory locations. Watchpoints further do not provide a way to associate an automatic check to the access of a watch location.

According to preferred embodiments of the present invention, a novel architectural support system and method are provided, including hardware and software support to monitor dynamic execution with minimal overhead, automatically, and flexibly. Preferred embodiments of the present invention provide an architecture that supports memory monitoring for software bug and security attack detection with small overhead, and that is highly consistent with current hardware approaches. A preferred embodiment monitoring system is a combination of hardware and software.

Generally, a preferred system and method associates program-specified monitoring functions with memory locations. When any such location is accessed, the monitoring function is automatically triggered with low overhead efficiently, for example without going through the operating system or other middle-layer software. More particularly, a preferred method for supporting software debugging and monitoring includes: associating one or more monitored memory location addresses with a monitoring function; detecting a triggering access at one or more monitored memory regions; accessing a function for determining a monitoring function when a triggering access is detected; and automatically and efficiently executing a monitoring function associated with a particular triggered memory region. The program execution can jump to the monitoring function efficiently, without going through the operating system.

As used herein, a "triggering access" is an access to a monitored memory location address, referred to herein as a memory region, which meets a predetermined access criterion. Examples of predetermined access criteria include a read access and/or a write access. A memory location may be, for example, a local or global variable in the stack or heap, a large memory buffer, or even a return address that is frequently corrupted by maliciously crafted network message to launch security attacks.

In a preferred embodiment, watchflags serve as monitors in a processor cache line to detect accesses to monitored memory locations, preferably small monitored memory regions. A small memory region, for example a word or other unit, may have either bit or byte granularity, and may be of any desired length. A "watchflag" is one or more bits (monitoring bits) added to a small region of hardware memory, such as a cache entry, indicating at least whether the small memory region is being monitored and the type of access that represents a triggering access for that small memory region.

In an exemplary method for monitoring small memory location addresses, each small memory region (e.g., entry) of the cache is extended by two bits to provide a watchflag. In preferred embodiments, one of the bits indicates whether or not a read access is a triggering access, and the other indicates whether or not a write access is a triggering access. These additional bits need not be at the beginning or end of a small memory region, but these bits will be also accessed at a reference to the corresponding data. Therefore, the necessary cache logic such as pins, wires inside the hardware cache need to be extended to support simultaneous access of these bits. Methods of extending the hardware cache will be appreciated by those of ordinary skill in the art.

Preferably, there is a watchflag associated with each of the small memory regions. However, it is not required that the watchflags be co-located with the monitored small memory regions, but instead the watchflags may be indexed. For example, all of the watchflags for a cache may be located together, watchflags for a cache line may be located together before the cache line, etc. The hardware preferably is instructed to check the watchflags in parallel with the small memory regions. In an exemplary method, the hardware is instructed to access an index of watchflags using the same address and line used for accessing the small memory regions.

In addition to the watchflags, a table or tables may be used for detecting larger memory regions (e.g., one or more pages). In preferred embodiments, a programmer can determine a cutoff between a small memory region and a larger memory region, for example, by selection of a size parameter. Thus, a "large" memory region as used herein is intended to refer to a memory location address that is larger than a small memory region. An exemplary table is an associative table including an indication of a particular large memory region (e.g., a starting and ending address of a memory region), and, for those large memory regions being monitored, a watchflag. The particular memory region resides in an exemplary processor in a way similar to the existing translation look-aside buffer (TLB) for fast lookups. In an exemplary operation, a central processing unit (CPU) accessing the large memory region is instructed to perform a check against the associative table, to determine whether access to the large memory region is a triggering access.

Upon the request of the software, the hardware sets the bit values for particular watchflags to determine whether particular memory regions are being monitored, and if so, whether only read accesses, write accesses or both are monitored. This functionality is exposed to software via a new hardware instruction, which is then used by an exemplary software component referred to herein as an iWatcher Library to allow applications to specify memory regions for monitoring. For example, a call within a C program may be used to set the watchflags, either to monitor a memory region (turn on a watchflag) or to stop monitoring the memory region (turn off a watchflag). It is contemplated that particular watchflags may be set via hardware or firmware functions, if desired, but it is preferred that software functions be used to set the watchflags. In preferred embodiments, a software function may also provide a global switch for turning on or turning off entire groups of watchflags if desired, including turning on or off all watchflags. This may be useful, for example, to reduce overhead.

In a preferred method, during runtime, if a memory region is accessed, the watchflag for that memory region is also accessed. From the state (values) of the watchflag for that memory region set by the software function, it is determined whether the accessed memory region is a monitored memory region and, based on a read or write access, whether the access is a triggering access (for example, an AND operation may be used for the result of two bits in a watchflag).

If a triggering access is determined, a monitoring function is located. Preferably, the located monitoring function is one that is associated with the accessed memory region, though it is also contemplated to first go through a general monitoring function before any user-specified monitoring functions. Software or firmware is used to monitor associations between the monitored memory locations (memory regions) and monitoring functions. Preferably, software applications are implemented in the architecture of the invention in a manner to conduct monitoring operations in parallel with software execution, to hide overhead.

It is also preferred that the location for executing a monitoring function be accessed from a common entry point in hardware, providing a gateway for monitoring functions. Preferably, a register serves as a common entry point for all monitoring operations. A benefit of having a common entry point is that otherwise it is expensive to remember mapping between the monitored memory region and a monitoring function in hardware. In a preferred embodiment, the common entry point jumps (points) to a function in a memory location, referred to herein as a main check function, which in turn links the accessed memory region with a particular monitoring function. More preferably, the common entry point includes a pointer, which is an address of the main check function. The software component in an exemplary embodiment stores the address for the main check function in the register at or near the beginning of a main program's execution.

In a preferred embodiment, the main check function refers to a software or firmware table associating locations of memory regions with particular software monitoring functions. Based on the results of the main check function, a software monitoring function is performed. In a preferred method, the monitoring function is performed in parallel with the currently-executing main program. This may be done, for example, by exploiting multiprocessor technology with thread level speculation (TLS) extension. Additional considerations may be made for out-of-order monitoring function execution, overflow of the L1 or L2 cache, the result of the monitoring function, and other possible issues during a session.

Such systems and methods provide several advantages. A preferred system and method monitors all accesses to the watched memory locations. Consequently, it catches hard-to-find bugs and malicious security attacks, such as updates through aliased pointers and stack-smashing attacks, commonly exploited by viruses. It is also very effective for bugs and security vulnerabilities such as buffer overflow, memory leaks, uninitialized reads, or accesses to freed locations.

Further, a preferred system has low overhead because it (i) only monitors memory instructions that truly access the watched memory locations, and (ii) uses minimal-overhead, hardware-supported, and automatic triggering of monitoring functions. A preferred system leveraging multiprocessors to execute monitoring functions in parallel with the program can hide monitoring overhead, and can support a program rollback if a bug is detected. A preferred system and method also is flexible in that it can support a wide range of checks, including program-specific checks. Moreover, such preferred architecture is language-independent, cross-module, and cross-developer.

Preferred embodiments of the present invention provide high-flexibility and low-overhead dynamic execution monitoring. They associate program-specified monitoring functions with memory locations, and thus are a type of location-controlled monitoring (LCM). When any such location is accessed, the monitoring function associated with it is automatically triggered and executed.

In experiments performed by the present inventors, an exemplary architecture was evaluated using buggy applications with memory corruption, memory leaks, buffer overflow, value invariant violations, outbound pointers, and smashed stacks. The exemplary architecture detected all the bugs evaluated, with only a 4-80% execution overhead. By contrast, a well-known open-source bug detector, Valgrind, induces orders of magnitude more overhead, and could only detect a subset of the bugs. Moreover, even with 20% of the dynamic loads monitored in a program, the exemplary architecture only added 66-174% overhead. Implementing TLS with the exemplary architecture was effective at reducing overheads for programs with substantial monitoring.

Referring now to the drawings, a personal computer (PC) 10 for use with a preferred monitoring architecture and method is shown in FIG. 1. The PC 10 includes processor hardware 12 for controlling processing functions of the PC, as will be appreciated by one of ordinary skill in the art. Memory 14, such as random access memory (RAM), is suitably coupled to the processor hardware 12. One or more storage devices 16, such as a hard disk drive, removable storage media drive, etc. are linked to the processor hardware 12. Further, one or more input/output devices 18, such as a keyboard, mouse, touchpad, sound card, network adapter, display adapter for driving a monitor 20, etc., may also be suitably linked to the processor hardware 12, as will also be appreciated by one of ordinary skill in the art. A bus 22 connects and allows communication among the processor hardware, memory, storage devices, and input/output devices in such a manner as will be appreciated by an artisan.

It should be understood that the PC 10, including the storage device 16, memory 14, input/output devices 18, processor hardware 12, monitor 20, etc., may be configured as is generally understood in the art. However, to perform certain aspects of presently preferred methods, features of the processor hardware 12, as well as data within the storage device 18 and/or memory 14, may be suitably configured, as explained herein. A storage medium readable by the storage device 16 or one or more signals, including signals propagating over a network, may also be configured to cause the PC 10 to perform aspects of presently preferred methods. Such configurations will be understood and appreciated by one of ordinary skill in the art having reference to the description and drawings herein.

Figure 2:
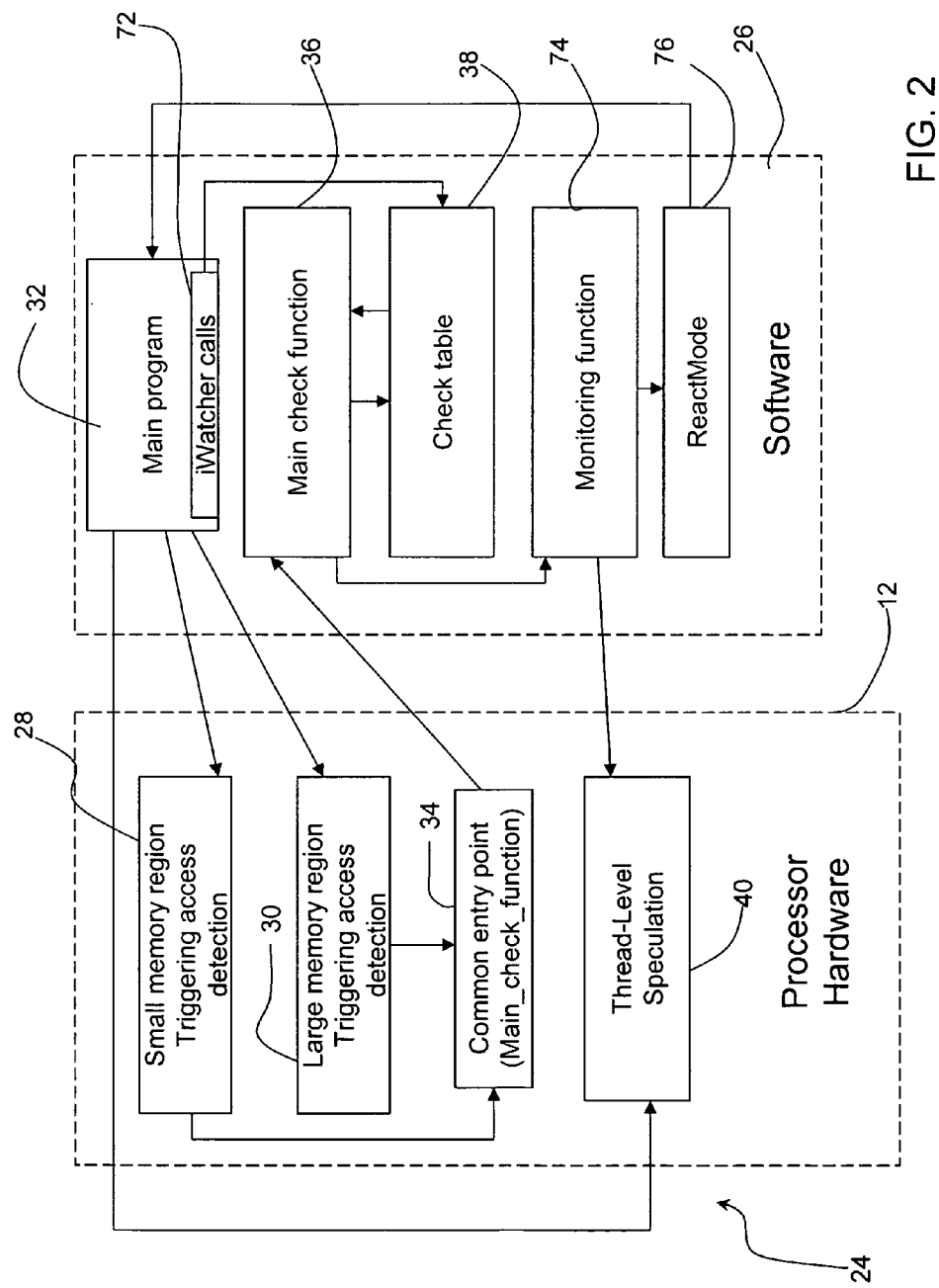
FIG. 2 is an overview of an exemplary architecture for supporting memory monitoring and debugging in accordance with a preferred embodiment of the present invention.

FIG. 2 shows a general view of a preferred debugging and monitoring architecture 24, according to exemplary embodiments of the present invention. The architecture 24 includes hardware features, which preferably are contained within the processor hardware 12, and software features 26, which may be, for example, linked to the monitored program.

Logically, the architecture 24 has four main components. First, two hardware structures are used to detect access to monitored locations (i.e., triggering accesses): a detector 28 for small memory region triggering accesses, and a detector 30 for large memory region triggering accesses. However, in alternative embodiments, a single detector may be used for detecting triggering accesses in small and large memory regions. A main software program 32 (e.g., the monitored program) accesses memory regions during execution, and thus accesses the detectors 28, 30. Second, to store a common entry point for all monitoring functions, the processor hardware 12 provides a special register, referred to herein as a main_check_function register 34, that points to a main_check_function 36, so that the hardware triggers monitoring functions on the fly. Third, software including the main_check_function 36 and an associative table, referred to herein as a check table 38, is used to manage the associations between watched locations and one or more monitoring functions. Fourth, preferred embodiments leverage thread-level speculation (TLS) 40 to reduce overheads and support different reaction modes. This TLS component 40 need not be used in all systems. However, use of TLS hides overhead by executing a monitoring function in parallel with the rest of the program, and adds ease of use by supporting program rollback if the monitoring function finds a bug.

To implement the functionality described above, there are multiple challenges, for example: how to monitor a location; how to detect a triggering access; how to trigger a monitoring function; and how to support the different reaction modes. To address these challenges, preferred embodiments are implemented in a monitoring system using a combination of hardware and software.

Figure 3:
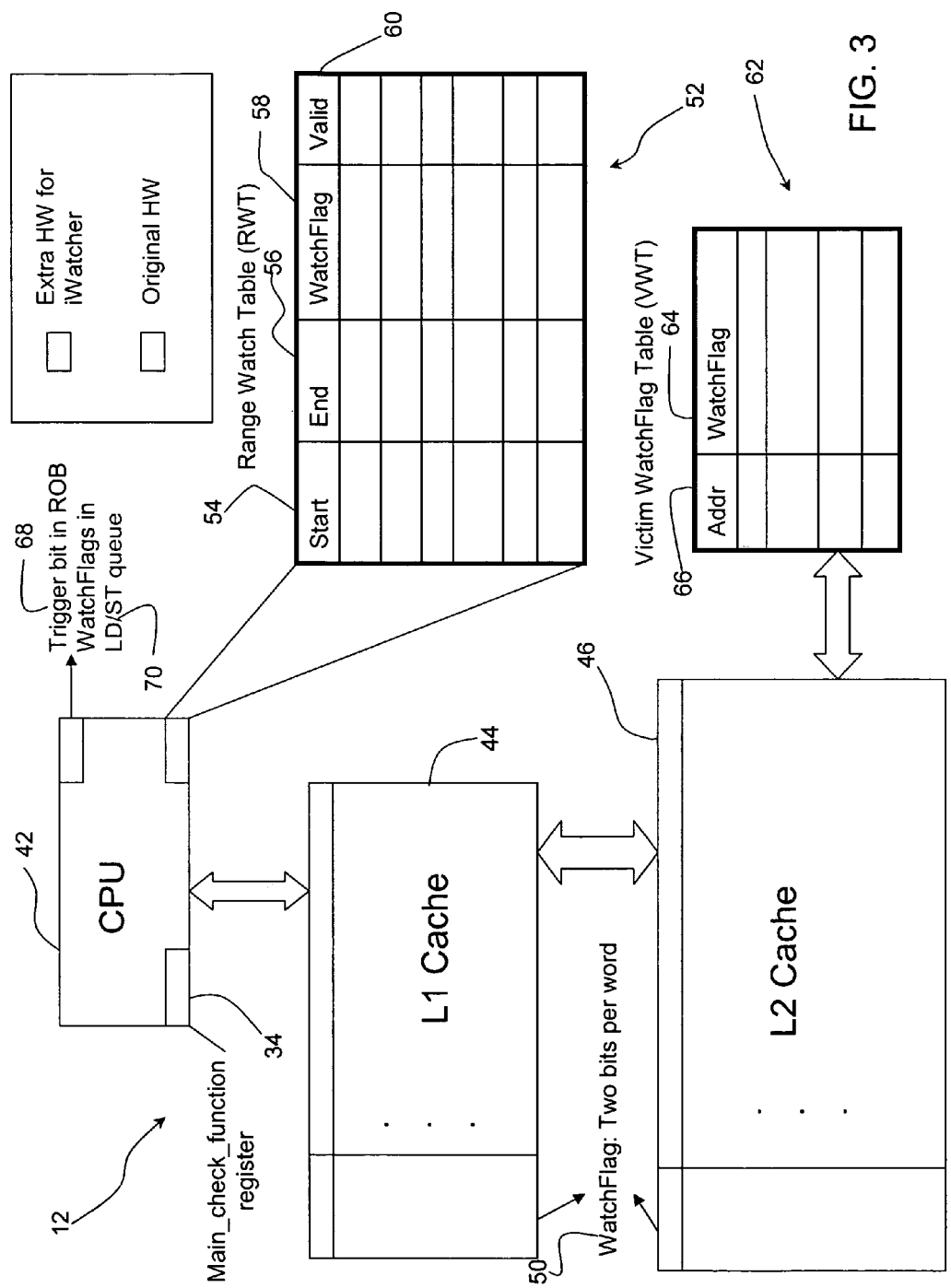
FIG. 3 shows an exemplary hardware architecture, according to a preferred embodiment of the present invention.

FIG. 3 shows an overview of an exemplary hardware architecture that can be incorporated into processor hardware to perform methods according to the present invention. The hardware architecture, as part of the processor hardware, generally includes a central processing unit (CPU) 42 and L1 and L2 caches 44, 46. In the exemplary architecture, hardware additions are made to the CPU 42 and to the L1 and L2 caches 44, 46.

To detect triggering accesses on small monitored memory regions, each line of the L1 and L2 caches 44, 46 is augmented with watchflags 50. In the architecture shown in FIG. 3, the watchflags 50 identify a single unit or word belonging to small monitored memory regions. There are two watchflag bits per word in the line: a read-monitoring one and a write-monitoring one. If the read (write) monitoring bit is set for a word, all loads (stores) to this word automatically trigger the corresponding monitoring function.

To detect accesses to large monitored memory regions, such as multiple pages in the monitored software's virtual memory, the architecture 12 includes a set of registers organized in a range watch table (RWT) 52, which is incorporated within the CPU 42. Each RWT entry stores virtual start 54 and end address 56 of a large region being monitored, plus two bits of watchflags 58 and one valid bit 60.

The CPU 12 includes the Main_check_function register 34, which holds the address of the Main_check_function( ). The Main_check_function( ) 36 is the common entry point to all program-specified monitoring functions. In addition, the L2 cache 46 includes a Victim Watchflag Table (VWT) 62, which stores Watchflags 64 for watched lines of small memory regions (identified by addresses 66) that have at some point been displaced from the L2 cache. To improve monitoring for out-of-order operations, the CPU (processor core) 42 is also enhanced with a trigger bit 68 for each reorder buffer entry, and two Watchflag bits 70 for each load-store queue entry.

Referring again to FIG. 2, software 26 in a preferred architecture includes function calls 72, which set or remove associations of memory locations with monitoring functions 74 to be run. The function calls preferably can be either part of the iWatcher library or the operating system. The software associative table, Check table 38, stores detailed monitoring information for each watched memory location. The information stored in Check table 38 may include, for example, MemAddr (a memory address), Length (a memory length), WatchFlag, ReactMode (reaction mode), MonitorFunc (a particular monitoring function associated with the watched memory location), and Parameters. Preferred software also implements the Main_check_function( ) library call 36, whose starting address is stored in the Main_check_function register 34. A reaction mode (ReactMode) 76 may be provided in software if the monitoring function 74 fails. Using the software 26 amplifies the processor hardware 12, and enables the overall system 24 to use sophisticated data structures.

Figure 4:
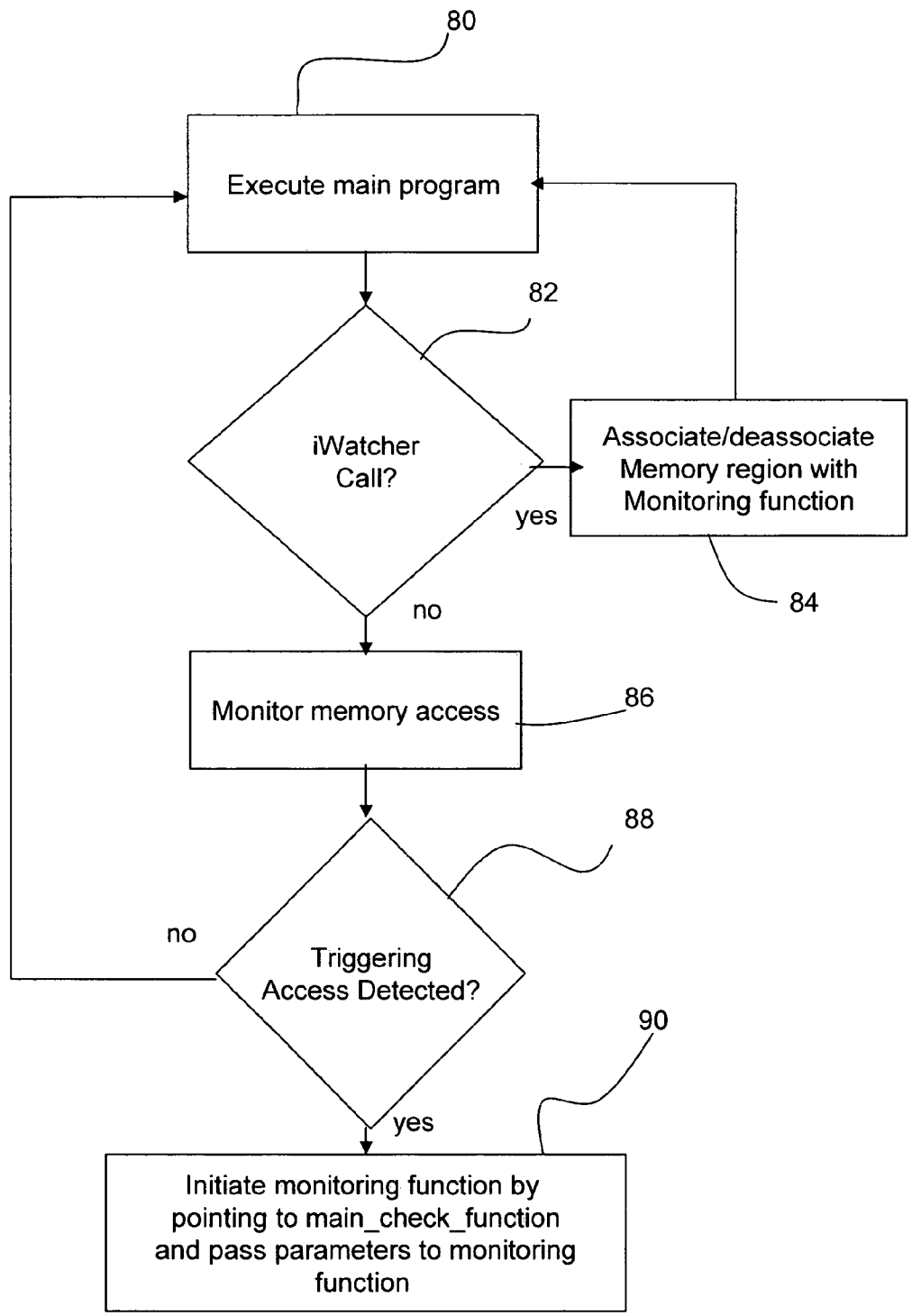
FIG. 4 shows steps in a general method for monitoring memory locations during execution of a main program, according to a preferred embodiment of the present invention.

FIG. 4 shows a general method for monitoring memory locations according to an exemplary embodiment of the present invention. There are two function calls 72 (FIG. 2) used by programs in preferred embodiments to turn on and off monitoring of a memory region, by adding or removing the corresponding entry to or from the Check table 38 and setting the corresponding watchflags in either the cache (for small memory regions) or the RWT table (for large memory regions). For illustration, these function calls 72 are referred to as iWatcherOn and iWatcherOff. These calls can be inserted in the main program 32 either automatically by a compiler or an instrumentation tool, or manually by programmers. The following is an example of the iWatcherOn interface:

```
iWatcherOn(MemAddr, Length, WatchFlag, ReactMode,
    MonitorFunc, Param1, Param2, . . . ParamN)
/* MemAddr: starting address of the memory region */
/* Length: length of the memory region */
/* WatchFlag: types of accesses to be monitored */
/* ReactMode: reaction mode */
/* MonitorFunc: monitoring function */
/* Param1 . . . ParamN: parameters of MonitorFunc */
```

Within execution (step 80) of the main program, if a program makes such a call (step 82), an exemplary embodiment associates (step 84) monitoring function MonitorFunc( ) with a memory region of Length bytes starting at MemAddr. The WatchFlag specifies what types of accesses to this memory region should be monitored to trigger MonitorFunc( ) and also instructs the hardware to set up the corresponding watchflags either in cache (for small memory region) or RWT (for large memory region). The value of WatchFlag in exemplary embodiments can be "READONLY", "WRITEONLY", or "READWRITE", in which case the monitoring function is triggered on a read access, write access, or both, respectively.

As shown in FIG. 2, the Check table 38 is a software table. An exemplary system uses one entry for each watched region. The entries are sorted by start address. To speed-up Check table 38 lookup, the system 24 exploits memory access locality to reduce the number of accessed table entries during one search. A table entry contains all arguments of the iWatcherOn( ) call. If there are multiple monitoring functions associated with the same location, they are linked together. Since the Check table 38 is a pure software data structure, it is easy to change its implementation. For example, another implementation could be to organize it as a hash table. It can be hashed with the address of the watched location.

During execution of the main program (step 80), memory access is monitored (step 86). If there is a triggering access (a read and/or write access to a monitored memory location depending on the watchflag) (step 88), the hardware automatically, and preferably without an intermediate program or without going through the operating system, initiates the monitoring function associated with this memory location (step 90). It is the monitoring function's responsibility to perform the check.

The RWT 52 is used to prevent large monitored memory regions overflowing the L2 cache 46 and the VWT 62. These lines are not loaded into the caches 44, 46 in an iWatcherOn( ) call. The Watchflags of these lines do not need to be set in the L1 or L2 cache unless the lines are also included in a small monitored region. When the RWT is full, additional large monitored regions are treated the same way as small regions.

A monitoring function can have side effects and can read and write variables without any restrictions. To avoid recursive triggering of monitoring functions, it is preferred that no memory access performed inside a monitoring function can trigger another monitoring function.

Figure 5:
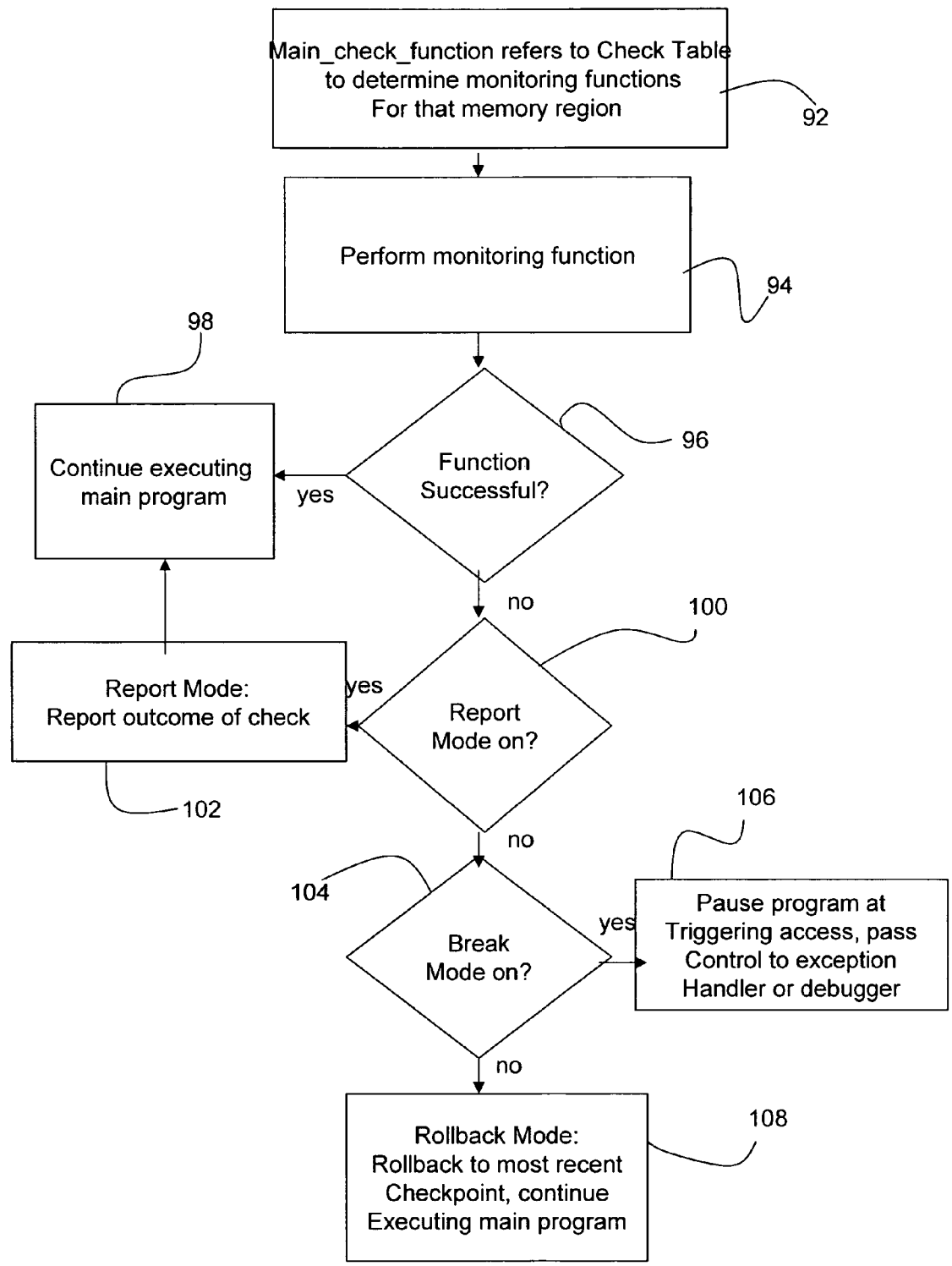
FIG. 5 shows a general method for debugging after a triggering access is indicated, according to a preferred embodiment of the present invention.

As shown in FIG. 5, the Main_check_function( ) 36 refers to the Check table 38 (step 92) to determine the monitoring functions for the accessed memory region, and the monitoring function(s) is/are performed (step 94). From the programmers' point of view, the execution of a monitoring function follows sequential semantics, just like a very lightweight exception handler. The semantic order is: the triggering access, the monitoring function, and the rest of the program after the triggering access.

Upon successful completion (step 96) of a monitoring function, the program continues normally (step 98). If the monitoring function fails (returns FALSE), different actions are taken depending on the ReactMode parameter specified in iWatcherOn( ). A preferred method supports three modes: ReportMode, BreakMode, and RollbackMode.

If ReportMode is selected (step 100), the monitoring function reports the outcome of the check (step 102) and lets the program continue (step 98). This mode can be used for profiling and error reporting without interfering with the execution of the program. If BreakMode is selected (step 104), the program pauses at the state right after the triggering access, and control is passed to an exception handler (step 106). Users can potentially attach an interactive debugger, which can be used to find more information. If RollbackMode is selected (step 108), the program rolls back to the most recent checkpoint, typically much before the triggering access. This mode can be used to support deterministic replay of a code section to analyze an occurring bug, or to support transaction-based programming. It will be understood that these react modes are exemplary, and that others may be appreciated by one of ordinary skill in the art. It will also be understood that the order in which ReportMode, BreakMode, and/or RollbackMode are considered in FIG. 5 is merely exemplary.

A program can associate multiple monitoring functions with the same location. In this case, upon an access to the watched location, all monitoring functions are executed following sequential semantics according to their setup order. Programmers can remove individual monitoring functions as needed.

Referring again to FIG. 4, when a program is no longer interested in monitoring a memory region (step 82), it turns off the monitor using a system call iWatcherOff:

```
iWatcherOff(MemAddr, Length, WatchFlag, MonitorFunc)
/* MemAddr: starting address of the watched region */
/* Length: length of the watched region */
/* WatchFlag: types of accesses to be unmonitored */
/* MonitorFunc: the monitoring function */
```

After this operation, the MonitorFunc associated with this memory region of Length bytes starting at MemAddr and WatchFlag is deleted from the system. Accessing the object with WatchFlag no longer invokes MonitorFunc( ). Other monitoring functions associated with this region are still in effect.

Besides using the iWatcherOff( ) call to turn off monitoring for a specified memory region, a preferred method can also use a MonitorFlag global switch that enables or disables monitoring on all watched locations. This switch is useful when monitoring overhead is a concern. When the switch is disabled, no location is watched, and the overhead imposed is negligible.

Preferred methods provide a very flexible mechanism for dynamic execution monitoring. It is not the responsibility of the exemplary architecture 24 to ensure that the monitoring function 74 is written correctly, just like an assert(condition) call cannot guarantee that the condition in the code makes sense. Programmers can use invariant-inferring tools such as DIDUCE and DAIKON to automatically insert iWatcherOn( ) and iWatcherOff( ) calls into programs.

With this support, one can rewrite the code error example described above using iWatcherOn( )/iWatcherOff( ) operations. There is no need to insert the invariant check. iWatcherOn( ) is inserted at the very beginning of the program so that the system can continuously check x's value whenever and however the memory location is accessed. This way, the bug is caught at line A.

```
int x, *p;
        /* assume invariant: x = 1 */
iWatcherOn (&x, sizeof (int), READWRITE, BreakMode,
        &MonitorX, &x, 1);
...
p = foo( ); /* a bug: p points to x incorrectly */
*p = 5; /* line A: a triggering access */
...
z = Array[x]; /* line B: a triggering access */
...
iWatcherOff(&x, sizeof(int), READWRITE, &MonitorX);
bool MonitorX(int *x, int value) {
        return (*x == value);
}
```

Figure 6:
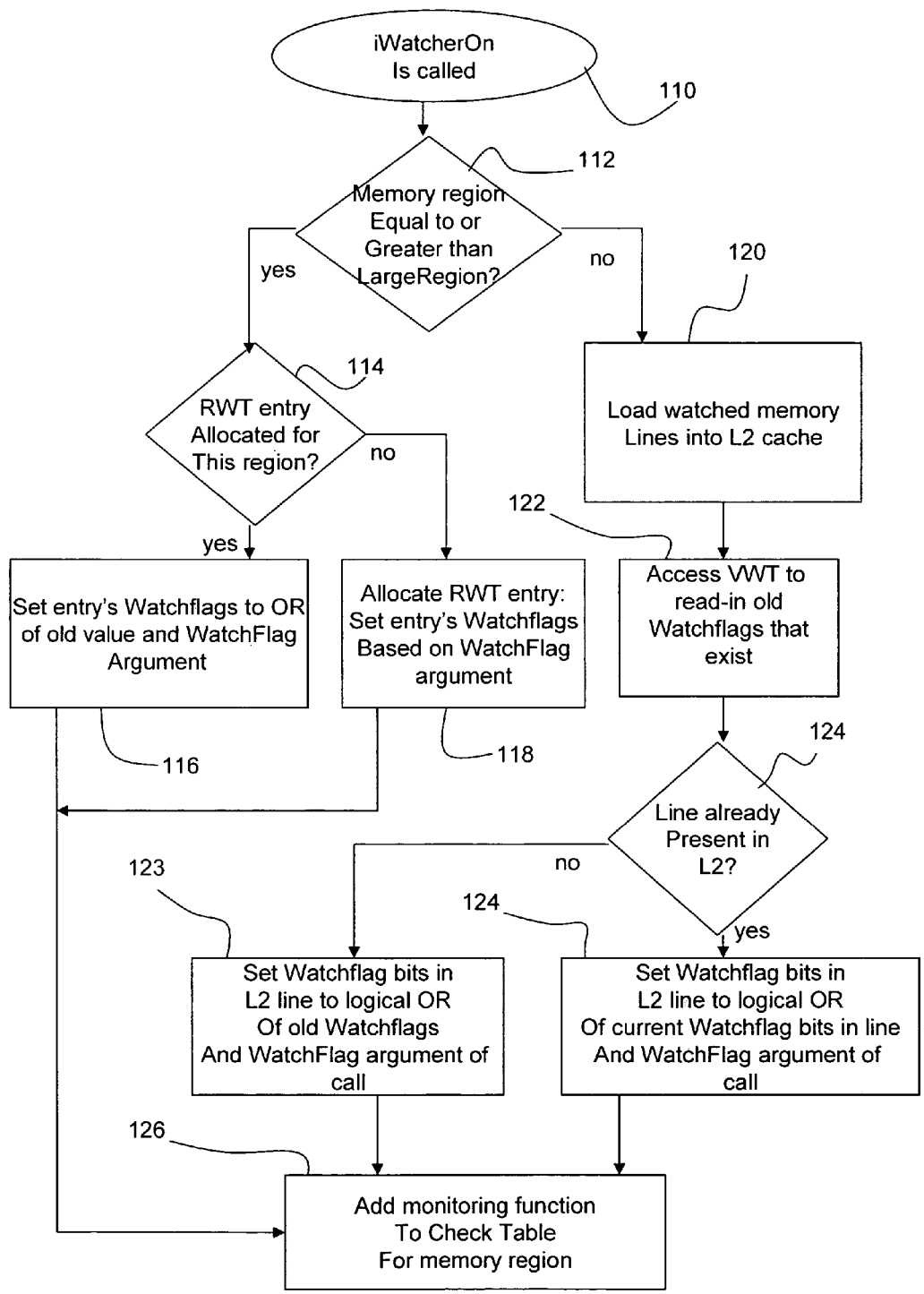
FIG. 6 shows a method for monitoring a memory region and associating the memory region with a monitoring function, according to a preferred embodiment of the present invention.
Figure 7:
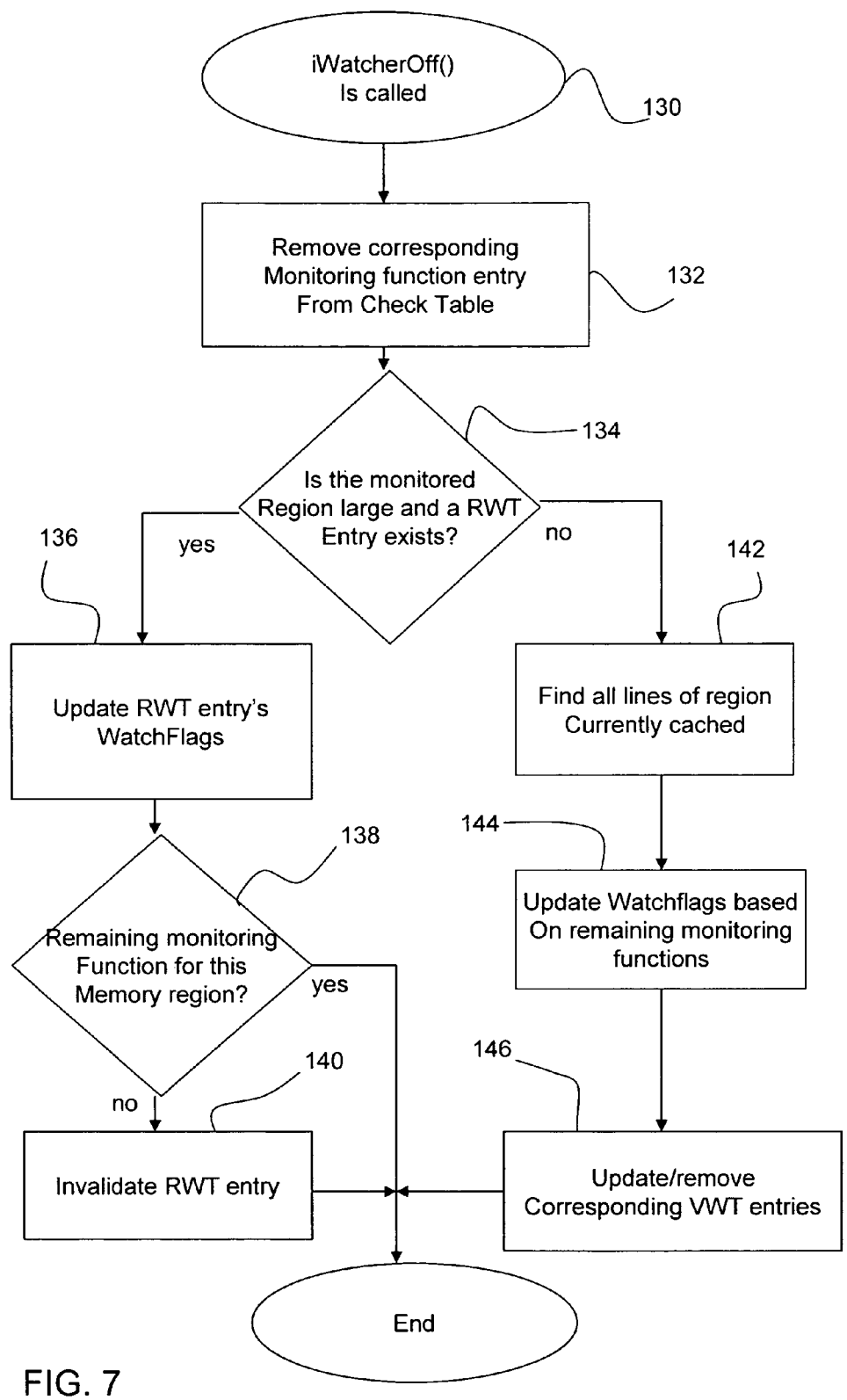
FIG. 7 shows a method for removing monitoring of a memory region, according to a preferred embodiment of the present invention.

An exemplary operation for watching a range of addresses is shown in FIGS. 6 and 7. When a program calls iWatcherOn( ) (step 110) (FIG. 6) and the memory region is equal or larger than LargeRegion (step 112), a preferred method tries to allocate an RWT entry 52 for this region. If there is already an entry for this region in the RWT 52 (step 114), iWatcherOn( ) sets the entry's watchflags to the logical OR of its old value and the WatchFlag argument of the call (step 116). If not, a new RWT entry is allocated, and the entry's watchflags are set based on the watchflag argument (step 118). If the region to be monitored is smaller than LargeRegion, the preferred method loads the watched memory lines into the L2 cache (if they are not already in L2) (step 120). The lines are not explicitly loaded into L1 to avoid unnecessarily polluting L1.

As a line is loaded from memory, the VWT is accessed (step 122) to read-in the old WatchFlags, if they exist there. Then, the WatchFlag bits in the L2 line are set to be the logical OR of the WatchFlag argument of the call and the old WatchFlags (step 123). If the line is already present in L2 (and possibly L1) (step 124), a preferred method simply sets the WatchFlag bits in the line to the logical OR of the WatchFlag argument and the current WatchFlag. In all cases, iWatcherOn( ) also adds the monitored location and the associated monitoring function including the watchflags into Check table (step 126) by software. It will be appreciated that adding the monitored location and the associated monitoring function (including the watchflags) into Check table may be done before or after the additions to the L2 cache or to the RWT.

When a program calls iWatcherOff( ) (step 130) (FIG. 7), the corresponding monitoring function entry is removed from the Check table (step 132). Moreover, if the monitored region is large and there is a corresponding RWT entry (step 134), iWatcherOff( ) updates this RWT entry's WatchFlags (step 136). The new value of the WatchFlags is computed from the remaining monitoring functions associated with this memory region, according to the information in the Check table. If there is no remaining monitoring function for this range (step 138), the RWT entry is invalidated (step 140). If, instead, the memory region is small (step 134), a preferred method finds all the lines of the region that are currently cached (step 142) and updates their watchflags based on the remaining monitoring functions (step 144). Any corresponding VWT entries are also updated and, if appropriate, removed (step 146).

The caches 44, 46 and the VWT 62 are addressed by the physical addresses of watched memory regions. If there is no paging by the operating system (OS), the mapping between physical and virtual addresses is fixed for the whole program execution. In an exemplary embodiment, it is assumed that watched memory locations are pinned by the OS, so that the page mappings of a watched region do not change until the monitoring for this region is disabled using iWatcherOff( ).

Note that the purpose of using the RWT 52 for large regions is to reduce L2 pollution and VWT space consumption: lines from this region will only be cached when referenced (not during iWatcherOn( )) and since they will never set their watchflags in the cache (their watchFlags are zeros), they will not use space in the VWT 62 on cache eviction. When an item for which L2 watchflags are set moves to the L1 cache, its watchflags are also loaded into L1.

It is possible that iWatcherOn( )/iWatcherOff( ) will access some memory locations sometimes as part of a large region and sometimes as a small region. In this case, the iWatcherOn( )/iWatcherOff( ) software handlers, as they add or remove entries to or from the Check table 38, preferably are responsible for ensuring the consistency between RWT entries and L2/VWT Watchflags.

Preferred embodiments need to identify those loads (read) and stores (write) that should trigger monitoring functions. A load or store is a triggering access if the accessed location is inside any large monitored memory regions recorded in the RWT 52, or the watchflags of the accessed line in L1/L2 are set.

In practice, the process of detecting a triggering access is complicated by the fact that modern out-of-order processors introduce access reordering and pipelining. To help in this process, preferred embodiments augment each reorder buffer (ROB) entry in the processor hardware with a "Trigger" bit 68, and augment each load-store queue entry with 2 bits that store watchflag information 70.

To keep the hardware reasonably simple, the execution of a monitoring function in preferred embodiments should only occur when a triggering load or store reaches the head of the ROB. At that point, the values of the architectural registers that need to be passed to the monitoring function are readily available. In addition, the memory system is consistent, as it contains the effect of all preceding stores. Moreover, there is no danger of mispredicted branches or exceptions, which could require the cancellation of an early-triggered monitoring function.

Figure 8:
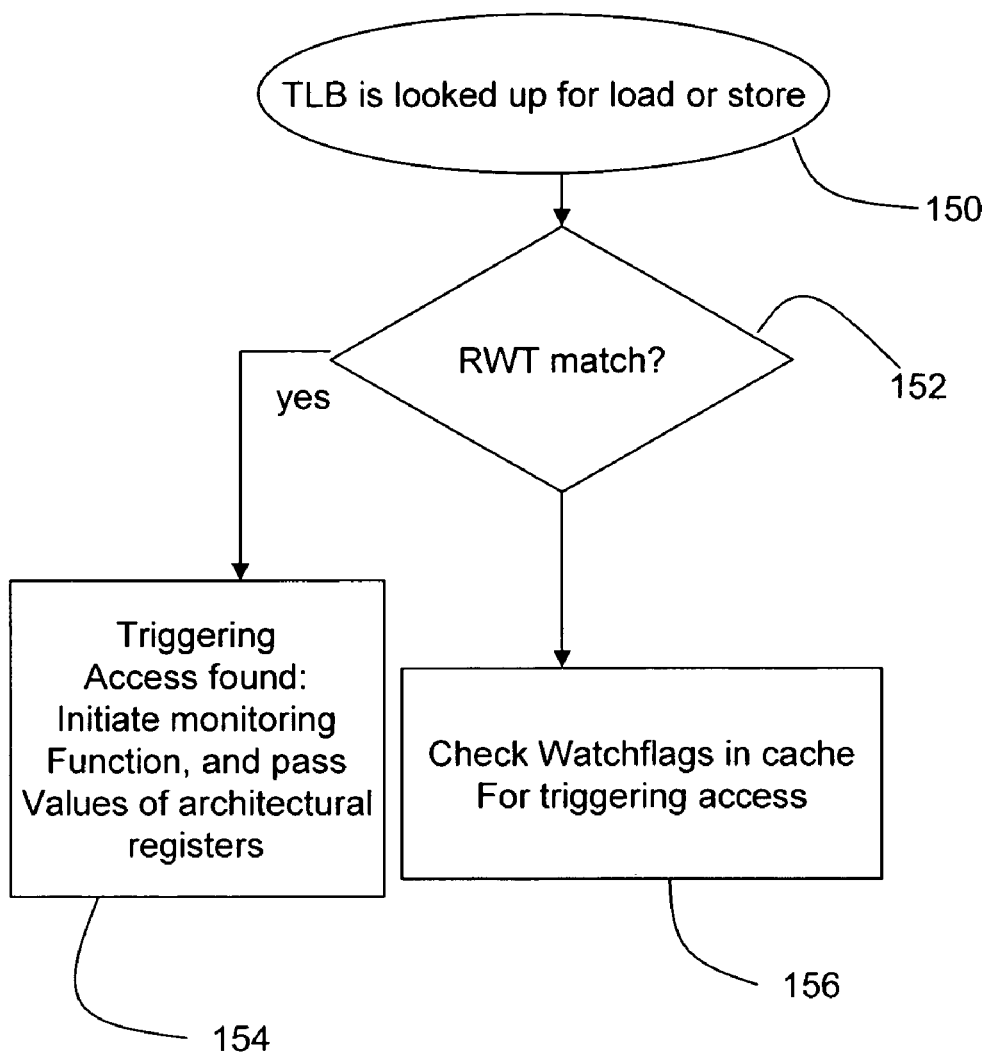
FIG. 8 shows a method for monitoring loads or stores of memory regions in a Range Watch Table (RWT), according to a preferred embodiment of the present invention.

Exemplary processor hardware 12 can identify a triggering access at two points. At one point, for a load or store, when the translation look-aside buffer (TLB) is looked up early in the pipeline (step 150) (see FIG. 8), the hardware also checks the RWT for a match (step 152) concurrently. This introduces negligible visible delay. If there is a match, the access is a triggering one (step 154). If there is no match, the Watchflags in the caches will be examined as a second point to determine if there is a triggering access (step 156).

Figure 9:
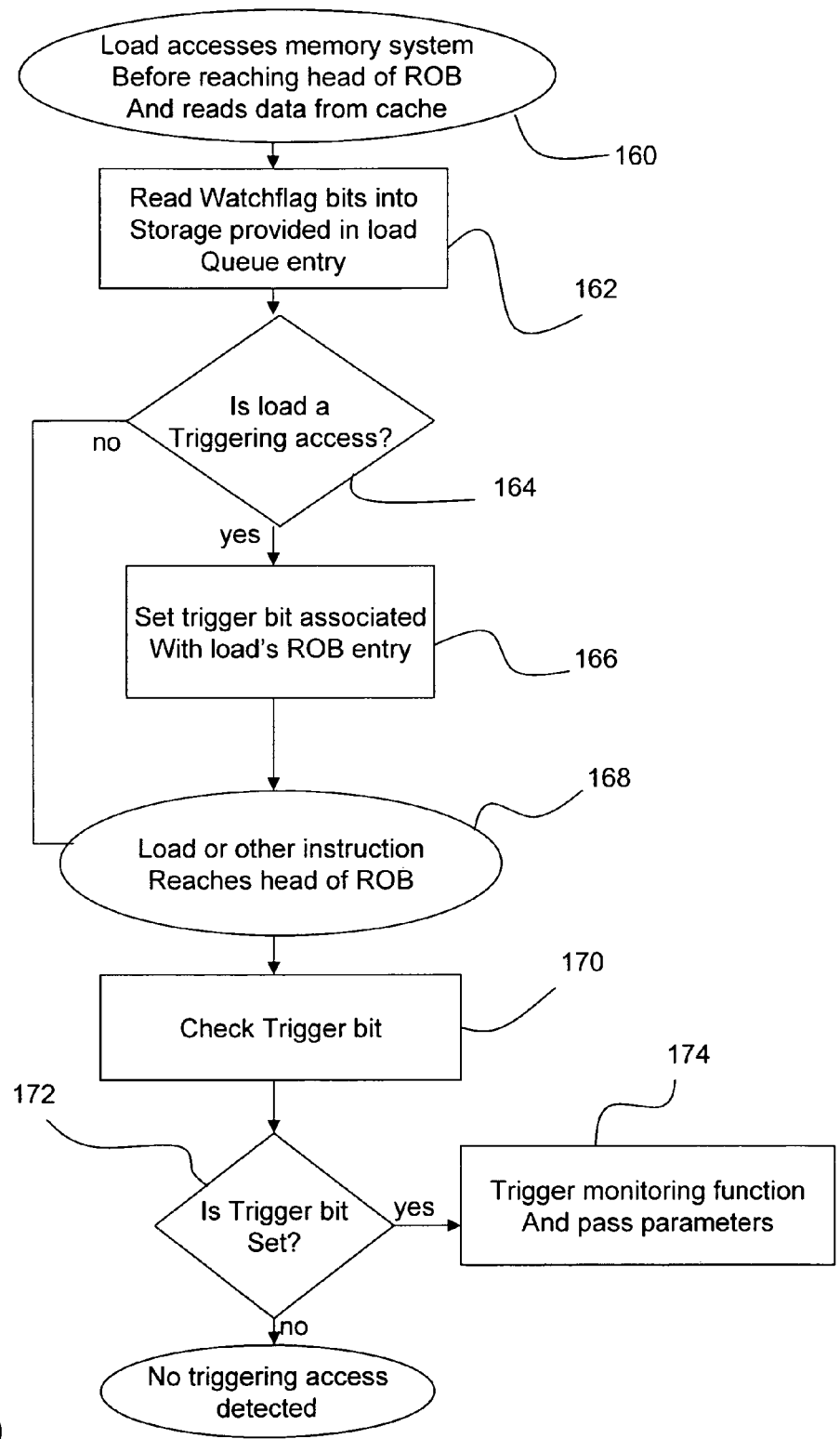
FIG. 9 shows a method for monitoring memory loads, according to a preferred embodiment of the present invention.

FIG. 9 shows an exemplary process for detecting a triggering access during a load using the watchflags in the caches 44, 46. A load typically accesses the memory system before reaching the head of the ROB. It is at that time that a triggering load will detect the set watchflags in the cache. Consequently, in a preferred embodiment, as a load reads the data from the cache into the load queue (step 160), it also reads the Watchflag bits into the special storage provided in the load queue entry 70 (FIG. 3) (step 162). In addition, if the RWT or the Watchflag bits indicate that the load is a triggering one (step 164), the hardware sets the Trigger bit 68 associated with the load's ROB entry (step 166). When the load (or any instruction) finally reaches the head of the ROB and is about to retire (step 168), the hardware checks the Trigger bit (step 170). If it is set (step 172), the hardware triggers the corresponding monitoring function (step 174).

Stores present a special difficulty. A store is not sent to the memory system by the processor 12 until it reaches the head of the ROB. At that point, it is retired immediately by the hardware, but it still may cause a cache miss, in which case it may take a long time to actually complete. In exemplary embodiments, this would mean that, for stores that do not hit in the RWT 58, the processor 12 would have to wait a long time to know whether it is a triggering access, especially for stores that do not hit in the RWT. During that time, no subsequent instruction can be retired, because the processor may have to trigger a monitoring function.

Figure 10:
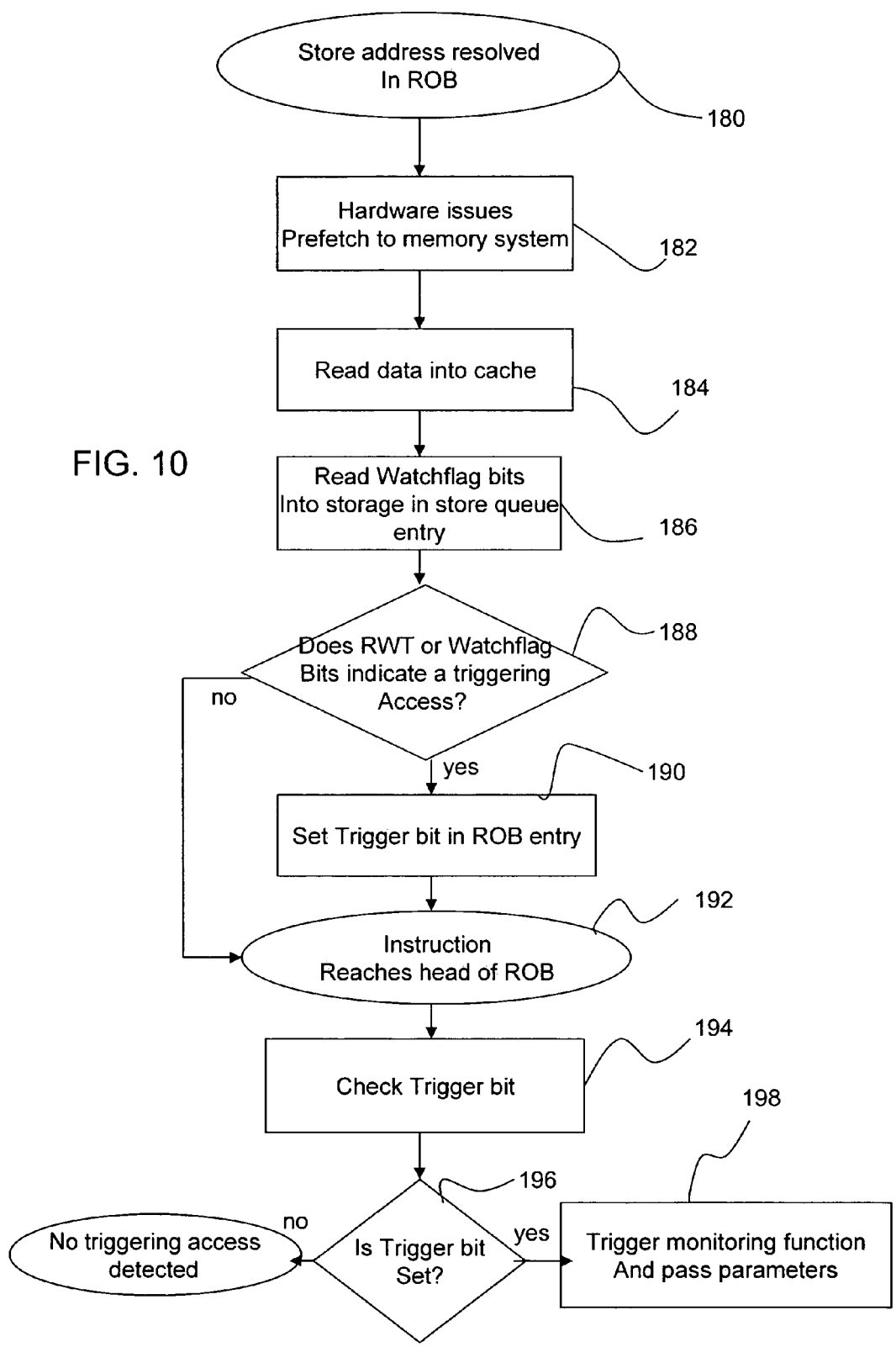
FIG. 10 shows a method for monitoring memory stores, according to a preferred embodiment of the present invention.

To reduce this delay as much as possible, preferred embodiments (see FIG. 10) change the micro-architecture so that, as soon as a store address is resolved early in the ROB (step 180), the hardware 12 issues a prefetch to the memory system (step 182). The prefetch brings (reads) the data into the cache (step 184), and the watchflag bits are read into the special storage in the store queue entry 70 (step 186). If the RWT or the watchflag bits indicate that the store is a triggering one (step 188), the Trigger bit in the ROB entry is also set (step 190). From there, when the instruction reaches the head of the ROB (step 192), the trigger bit is checked (step 194), and if set (step 196), a monitoring function is triggered (step 198). With this support, the processor is much less likely to have to wait when the store reaches the head of the ROB. However, it is possible that such a prefetch may affect the memory consistency model supported in a multiprocessor environment.

Note that bringing the watchflag information into the load-store queue entries 70 enables correct operation for loads that get their data directly from the load-store queue. For example, if a store in the load-store queue has the read-monitoring watchflag bit set, then a load that reads from it will correctly set its own trigger bit.

Figure 11:
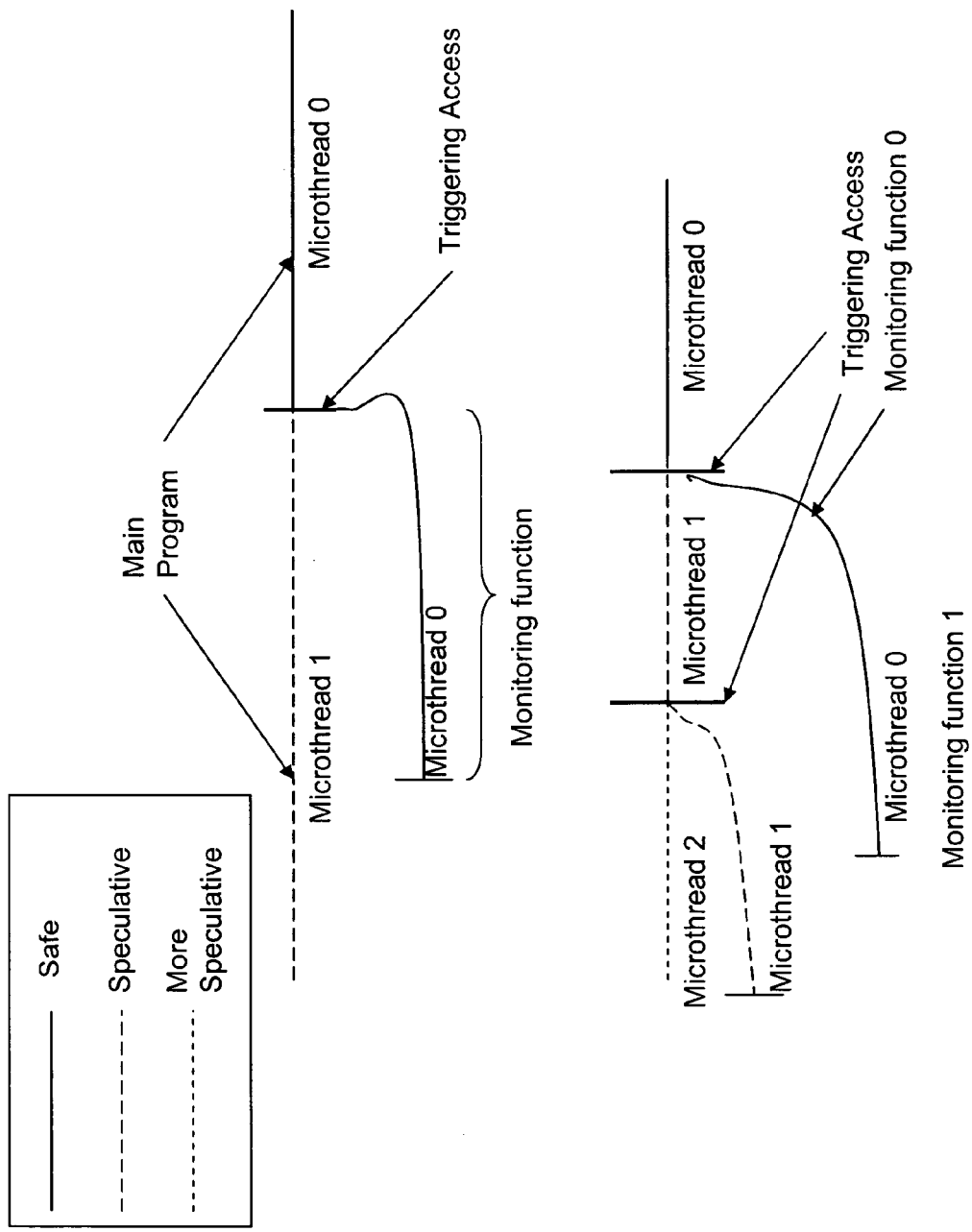
FIG. 11 shows a method for implementing thread-level speculation (TLS) after a triggering access is determined, according to a preferred embodiment of the present invention.

Referring now to FIG. 11, when the hardware retires a triggering load or store, its associated monitoring function is automatically initiated. Particularly, when a triggering access occurs, the hardware automatically saves the architectural registers and the program counter, then redirects execution by setting the program counter to the address in the Main_check_function register 34. The address in the Main_check_function register may be stored, for example, by software at or near the beginning of execution of the main program. The Main_check_function( ) 36 is responsible to call the program-specified monitoring function(s) 74 associated with the accessed location. To do this, it needs to search the Check table 38 and find the corresponding function(s).

The Main_check_function( ), implemented in the preferred software component, passes the values of Param1 through ParamN to the monitoring function 74. In addition, it also passes information about the triggering access, including the program counter, the type of access (load or store; word, half-word, or byte access), reaction mode, and the memory location being accessed. After the monitoring function completes, execution resumes from the saved program counter.

In a preferred embodiment, programmers can leverage TLS mechanisms 40 to speculatively execute the main program 32 in parallel with monitoring functions 74. TLS is an architectural technique for speculative parallelization of sequential programs. TLS support can be built on a multi-threaded architecture, such as simultaneous multithreading (SMT) or chip multiprocessor (CMP) machines. Moreover, a preferred embodiment can also leverage TLS 40 to roll back the buggy code with low overhead, for subsequent replay. While TLS has previously been used to hide overheads, the preferred architecture uses a different TLS spawning mechanism. Specifically, the preferred architecture uses dynamic hardware spawning, which requires no code instrumentation, as opposed to, say, inserting thread-spawning instructions in a code statically.

With TLS, the execution of a sequential program is divided into a sequence of microthreads (also called tasks, slices, or epochs). These microthreads are then executed speculatively in parallel, while special hardware, as will be appreciated by an artisan, detects violations of the program's sequential semantics. Any violation results in squashing the incorrectly executed microthreads and re-executing them. To enable squash and re-execution, the memory state of each speculative microthread is typically buffered in caches or special buffers. When a microthread finishes its execution and becomes safe, it can commit. Committing a microthread merges its state with the safe memory. To guarantee sequential semantics, microthreads commit in order.

Preferred embodiments of the present invention can leverage TLS to reduce monitoring overhead and to support rollback and re-execution of a buggy code region. In an exemplary embodiment, one assumes an SMT machine, and that the speculative memory state is buffered in caches. However, other TLS architectures are contemplated.

In a preferred embodiment, each cache line is tagged with the ID of the microthread to which the line belongs. Moreover, for each speculative microthread, the processor 12 contains a copy of the initial state of the architectural registers. This copy is generated when the speculative microthread is spawned, and it is freed when the microthread commits. It is used in case the microthread needs to be rolled back.

The TLS mechanisms for in-cache state buffering and rollback can be reused to support incremental rollback and re-execution of the buggy code. To do this, the basic TLS is modified slightly by postponing the commit time of a successful microthread. See, e.g., M. Prvulovic and J. Torrellas, ReEnact: Using thread-level speculation mechanisms to debug data races in multithreaded codes. In *ISCA*, June 2003. In basic TLS, a microthread can commit when it completes and all its predecessors have committed. Such a microthread is considered "ready". To support the rollback of buggy code, a ready microthread in preferred embodiments commits only in one of two cases: when space is needed in the cache, and when the number of uncommitted microthreads exceeds a certain threshold. With this support, a ready but uncommitted microthread can still be asked to rollback. This feature can be used to support a rollback mode of a preferred architecture in reaction to a memory address being accessed.

Using TLS mechanisms, when the hardware retires the triggering access, a preferred embodiment automatically spawns a new microthread, which is shown by example in FIG. 11, and denoted as microthread 1. This microthread speculatively executes the rest of the program 32 after the triggering access, while the current microthread, denoted in FIG. 11 as microthread 0, executes the monitoring function 74 non-speculatively. To provide sequential semantics (the remainder of the program is semantically after the monitoring function), data dependencies are tracked by TLS, and any violation of sequential semantics results in the squash of the speculative microthread (microthread 1).

Microthread 0 executes the monitoring function 74 by starting from the address stored in the Main_check_function register 34. It is the responsibility of the Main_check_function( ) 36 to find the monitoring functions 74 associated with the triggering access and call all such functions one after another. Note that, although semantically, a monitoring function appears to programmers like a user-specified exception handler, the overhead of triggering a monitoring function is tiny with the preferred hardware support.

For example, while triggering an exception handler typically needs OS involvement, triggering a monitoring function in preferred embodiments, with or without TLS is done completely in hardware: the hardware automatically fetches the first instruction from the Main_check_function( ). A preferred system can skip the OS because monitoring functions are not related to any resource management in the system and, in addition, do not need to be executed in privileged mode. Moreover, the Main_check_function( ) and the check table are in the same address space as the monitored program. Therefore, a "bad" program cannot use the preferred system to mess up other programs.

Microthread 1 speculatively executes the continuation of the monitoring function; i.e., the remainder of the program after the triggering access. To avoid the overhead of flushing the pipeline, preferred embodiments dynamically change the microthread ID of all the instructions currently in the pipeline from 0 to 1. Unfortunately, it is possible that some un-retired load instructions after the triggering access may have already accessed the data in the cache and, as per TLS, already updated the microthread ID in the cache line to be 0. Since the microthread ID on these cache lines should now be 1, the hardware re-touches the cache lines that were read by these un-retired loads, correctly setting their microthread IDs to 1. There is no such problem for stores because they only update the microthread IDs in the cache at retirement.

It is possible that a speculative microthread issues a triggering access, as also shown in FIG. 11. In this case, a more speculative microthread (microthread 2) may be spawned to execute the rest of the program, while the speculative microthread (microthread 1) enters the Main_check_function. Since microthread 2 is semantically after microthread 1, a violation of sequential semantics will result in the squash of microthread 2. In addition, if microthread 1 is squashed, microthread 2 is squashed as well. Finally, if microthread 1 completes while speculative, a preferred system does not commit it; it can only commit after microthread 1 becomes safe.

Note that, in a multiprocessor system, microthreads should be allocated for cache affinity. In the example shown in FIG. 11, speculative microthread 1 should be kept on the same CPU as the original program, while microthread 0 should be moved to a different CPU. This is because microthread 1 continues to execute the program and is likely to reuse cache state.

Figure 12:
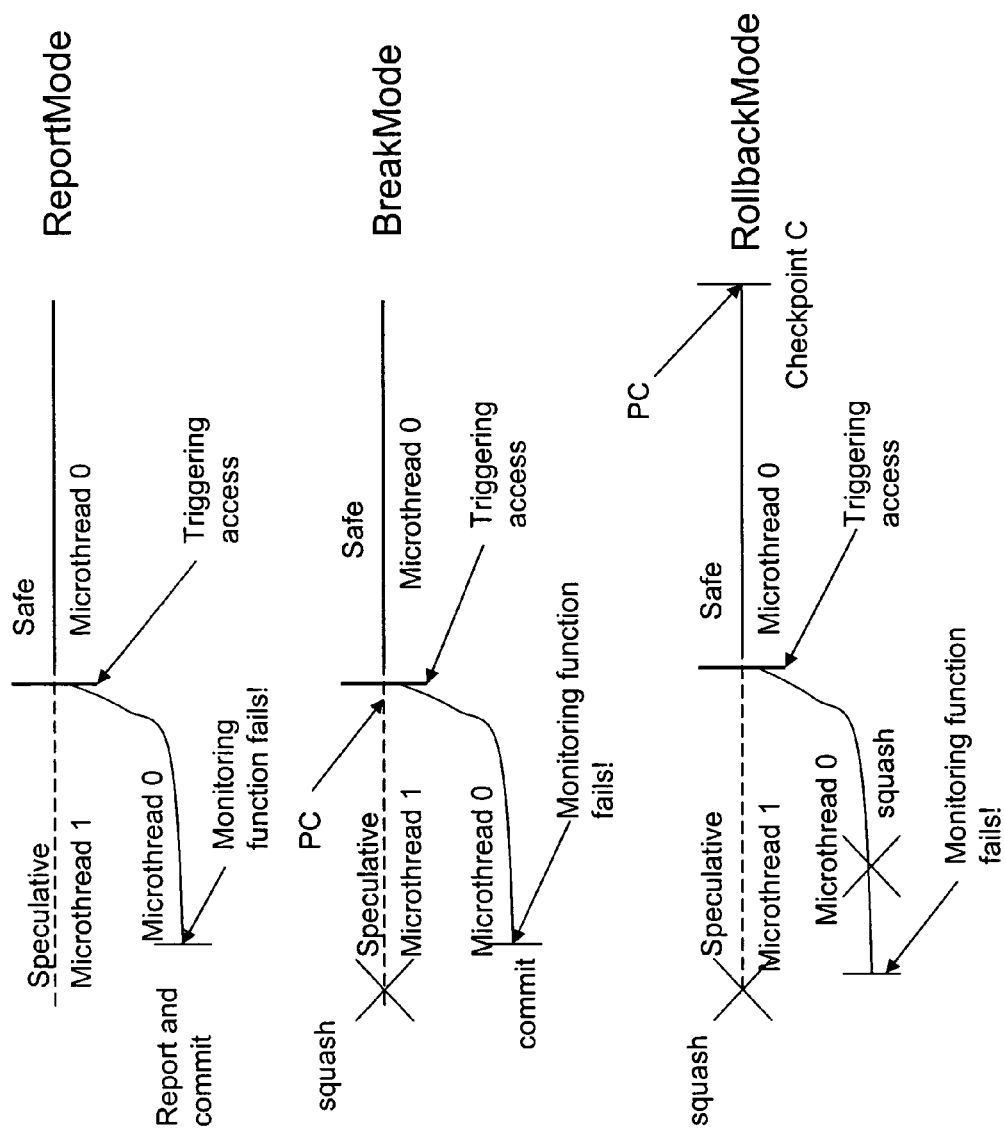
FIG. 12 shows a method for implementing TLS for three react modes, according to a preferred embodiment of the present invention.

Referring to FIG. 5 and to FIG. 12, if a monitoring function fails (step 96) (detects a bug), a preferred system 24 takes different actions depending on the function's ReactMode. FIG. 12 illustrates three exemplary reaction modes, supported by a preferred embodiment system. ReportMode is the simplest one. The monitoring function 74 reports the check's outcome and lets the program 32 continue. This mode, which is for profiling and error reporting, does not interfere with program execution. For example, it is treated the same way as if the monitoring function had succeeded: microthread 0 commits and microthread 1 becomes safe.

If the reaction mode is BreakMode, if the monitoring function 74 detects an error, the program 32 pauses at the state right after the triggering access, and control passes to an exception handler. For example, the system commits microthread 0 but squashes microthread 1. The program state and the program counter (PC) of microthread 1 are restored to the state it had immediately after the triggering access. At this point, programmers can use an interactive debugger to analyze the bug.

If the reaction mode is RollbackMode, the program rolls back to the most recent checkpoint, typically much earlier than the triggering access. This mode requires checkpointing and rollback support. This mode supports transaction-based programming or the replay of a code section to analyze a bug. For example, the system squashes microthread 1 and also rolls back microthread 0 to the most recent checkpoint, the checkpoint at PC, as shown in FIG. 12. A preferred system can use support similar to ReEnact (M. Prvulovic and J. Torrellas, "ReEnact: Using thread-level speculation mechanisms to debug data races in multithreaded codes," *ICSA*, June 2003) to provide this reaction mode.

During operation of exemplary embodiments of the present invention, the issues of displacements and cache misses may arise. When a watched line of small regions is about to be displaced from the L2 cache 46, its watchflags are saved in the VWT 62. The VWT 62 is a small set-associative buffer. If the VWT 62 needs to take an entry while full, it selects a victim entry to be evicted, and delivers an exception. The OS then turns on page protections for the pages that correspond to the watchflags 64 to be evicted from the VWT 62. Future accesses to these pages will trigger page protection faults, which will enable the OS to insert their watchflags back into the VWT 62. However, a 1024-entry VWF, for example, may be sufficiently large to prevent it from being filled. This is because the VWT 62 only keeps the watchflags for watched lines of small memory regions that have at some point been displaced from L2 cache 46.

On an L2 cache miss, as the line is read from memory, the VWT is checked for an address match. If there is a match, the Watchflags for the line are copied to the destination location in the cache. The Watchflags are not removed from the VWT, because the memory access may be speculative and be eventually undone. If there is no match, the Watchflags for the loaded line are set to the default "un-watched" value. This VWT lookup is performed in parallel with the memory read and, therefore, introduces negligible visible delay.

Aside from these issues, caches work as in conventional TLS systems. In particular, speculative lines cannot be displaced from the L2. If space is needed in a cache set that only holds speculative lines, a speculative microthread is squashed to make room. See M. Prvulovic and J. Torrellas, "ReEnact: Using thread-level speculation mechanisms to debug data races in multithreaded codes," *ICSA*, June 2003.

To evaluate embodiments of the present invention, an execution-driven simulator was built that models a workstation with a 4-context SMT processor augmented with TLS support and functionality according to an exemplary architecture and method, referred to herein as iWatcher. The parameters of the exemplary architecture are shown in FIG. 13. As seen in the table, each microthread is allocated 32 load-store queue entries. We model the overhead of spawning a monitoring-function microthread as 5 cycles of processor stall visible to the main-program thread. The reaction mode used in all experiments is ReportMode, so that all programs can run to completion.

To isolate the benefits of TLS, we also evaluate the same architecture without TLS support. On a triggering access, the processor first executes the monitoring function, and then proceeds to execute the rest of the program. Finally, we simulate the same architecture with no iWatcher or TLS support. For the evaluation without TLS support, the single microthread running is given a 64-entry load-store queue.

In this evaluation, we compare the functionality and overhead of iWatcher to Valgrind (J. Seward, "Valgrind", URL: http://valgrind.kde.org/), an open-source memory debugger for x86 programs. Valgrind is a binary-code dynamic checker to detect general memory-related bugs such as memory leaks, memory corruption, and buffer overflow. It simulates every single instruction of a program. Because of this, it finds errors not only in a program but also in all supporting dynamically-linked libraries. Valgrind takes control of a program before it starts. The program is then run on a synthetic x86 CPU, and its every memory access is checked. All detected errors are reported.

Valgrind provides an option to enable or disable memory leak detection. We also enhanced Valgrind to enable or disable variable uninitialization checks and invalid memory access checks (checks for buffer overflow and invalid accesses to freed memory locations).

In the experiments, we run Valgrind on a real machine with a 2.6 GHz Pentium 4 processor, 32-Kbyte L1 cache, 2-Mbyte L2 cache, and 1-Gbyte main memory. Since iWatcher as used in these exemplary experiments runs on a simulator, we cannot compare the absolute execution time of iWatcher with that of Valgrind. Instead, we compare their relative execution overheads over runs without monitoring.

Two sets of experiments were conducted. The first one uses applications with bugs to evaluate the functionality and overheads of iWatcher for software debugging. The second one systematically evaluates the overheads of iWatcher to monitor applications without bugs.

The applications used in the first set of experiments contain various bugs, including memory leaks, memory corruption, buffer overflow, stack-smashing attacks, value invariant violations, and outbound pointers. These applications are bc-1.03 (an arbitrary precision calculator language), cachelib (a cache management library developed at University of Illnois at Urbana-Champaign) and gzip (a SPECINT 2000 application running the test input data set). Of these codes, bc-1.03 and cachelib already had bugs, while we injected some common bugs into gzip.

FIG. 14 shows the details of the bugs and monitoring functions. For gzip, we evaluate the case of single bugs: stack-smashing, memory corruption, buffer overflow (dynamic buffer overflow and static array overflow), memory leak, or value invariant violation. We also evaluate the case of a combination of bugs (memory leak, memory corruption, and dynamic buffer overflow). FIG. 14 shows the names given to each buggy application.

For a fairer comparison between Valgrind and iWatcher, in Valgrind we enable only the type of checks that are necessary to detect the bug(s) in the corresponding application. For example, for gzip-ML, we enable only the memory leak checks. Similarly, for gzip-MC and gzip-B01, we enable only the invalid memory access checks. In all of the experiments, variable uninitialization checks are always disabled.

To detect bugs such as stack smashing, memory corruption, dynamic buffer overflow, memory leak, or static array overflow, the exemplary iWatcher monitoring functions are very general. They monitor all possible relevant locations without using program-specific semantic information. In addition, all iWatcherOn/Off( ) calls can be inserted by an automated tool without any semantic program information. These rules were enforced to have a fair comparison with Valgrind, which does not have any semantic program information. Therefore, the comparison is believed to be fair.

To detect other bugs, such as value invariant violations and outbound pointers, program-specific information is needed. Valgrind cannot detect these bugs, whereas iWatcher can.

For gzip with memory leak, iWatcher not only detects all dynamic memory buffers that are not freed; it also ranks buffers based on their access recency. Buffers that have not been accessed for a long time are more likely to be memory leaks than the recently accessed ones.

Finally, the second set of experiments evaluates iWatcher overheads by monitoring memory accesses in two unmodified SPECINT 2000 applications running the Test input data set, namely gzip and parser. We measure the overhead as we vary the percentage of dynamic loads monitored by iWatcher ant the length of the monitoring function.

FIG. 15 compares the effectiveness and the overhead of Valgrind and iWatcher. For each of the buggy applications considered, the table shows whether the schemes detect the bug and, if so, the overhead they add to the program's execution time. As stated above, Valgrind's times are measured on a real machine, while iWatcher's are simulated.

Consider effectiveness first. Valgrind can detect memory corruption, dynamic buffer overflow, memory leak bugs, and the combination of them. iWatcher, instead, detects all the bugs considered. iWatcher's effectiveness is largely due to its flexibility to specialize the monitoring function.

The table also shows that iWatcher has a much lower overhead than Valgrind. For bugs that can be detected by both schemes, iWatcher only adds 9-43% overhead, a factor of 25-169 smaller than Valgrind. For example, in gzip-COMBO, where both iWatcher and Valgrind monitor every access to dynamically-allocated memory, iWatcher only adds 43% overhead, which is 39 times less than Valgrind. iWatcher's low overhead is the result of triggering monitoring functions only when the watched locations are actually accessed, and of using TLS to hide monitoring overheads. The difference in overhead between Valgrind and iWatcher is larger in gzip-MC, where we are looking for a pointer that de-references a freed-up location. In this case, iWatcher only monitors freed memory buffers, and any triggering access uncovers the bug. As a result, iWatcher's overhead is 169 times smaller than Valgrind's. Finally, our results with Valgrind are consistent with the numbers (25-50 times slowdown) reported in a previous study (J. Seward, Valgrind, an open-source memory debugger for x86-GNU/Linux, located at URL: http://www.ukuug.org/events/linux2002/papers/html/valgrind/).

If one considers all the applications, we see that iWatcher's overhead ranges from 4% to 80%. This overhead comes from three effects. The first one is the contention of the monitoring-function microthreads and the main program for the processor resources (such as functional units or fetch bandwidth) and cache space. Such contention has a high impact when there are more microthreads executing concurrently than hardware contexts in the SMT processor. In this case, the main-program microthread cannot run all the time. Instead, monitoring-function and main-program microthreads share the hardware contexts on a time-sharing basis.

Columns 2 and 3 of FIG. 16 show the function of time that there is more than one microthread running or more than four microthreads running, respectively. These figures include the main-program microthread. Note that having more than four microthreads running does not mean that the main-program microthread starves: the scheduler will attempt to share all the contexts among all microthreads fairly. From the table, we see that three applications use more than 1 microthread for more than 1% of the time. Of those, there are two that use more than 4 microthreads for a significant fraction of the time. Specifically, this fraction is 15.2% for gzip-COMBO and 16.9% for gzip-ML. Note that these applications have high iWatcher overhead in FIG. 15. bc-1.03 is a short program, and even a little contention has a significant impact on the execution time.

A second source of overhead is the iWatcherOn/Off( ) calls. These calls consume processor cycles and, in addition, bring memory lines into L2, possibly polluting the cache. The overhead caused by iWatcher On/Off( ) can not be hidden by TLS. In practice, their effect is small due to the small number of calls, except in gzip-STACK. Indeed, Columns 5 and 6 of FIG. 16 show the absolute number of iWatcher On/Off( ) calls and the average size of an individual call. Except for gzip-STACK, the product of number of calls times the size per call is tiny compared to the hundreds of millions of cycles taken by the application to execute. For these cases, it can be shown that, even if every line brought into L2 by iWatcher On/Off( ) calls causes one additional miss, the overall effect on program execution time is very small.

The exception is gzip-STACK, where the number of iWatcherOn/Off( ) calls is huge (4,889,642). These calls introduce a large overhead that cannot be hidden by TLS. Moreover, iWatcherOn/Off( ) calls partially cripple some conventional compiler optimizations such as register allocation. The result is worse code and additional overhead. Overall, while for most applications the iWatcherOn/Off( ) calls introduce negligible overhead, for gzip-STACK, they are responsible for most of the 80% overhead of iWatcher.

Finally, there is a third, less important source of overhead in iWatcher, namely the spawning of monitoring-function microthreads. As indicated above, each spawn takes 5 cycles. Column 4 of FIG. 16 shows the number of triggering accesses per million instructions. Each of these accesses spawns a microthread. From the table, we see that this parameter varies a lot across applications. However, given the small cost of each spawn, the total overhead is small.

Overall, we conclude that the overhead of iWatcher can be high (37-80%) if the application needs to execute more concurrent microthreads than contexts provided by the SMT processor, or the application calls iWatcherOn/Off( ) very frequently. For the other applications analyzed, the overhead is small, ranging from 4% to 23%.

Finally, the last three columns of FIG. 16 show other parameters of iWatcher execution: average monitoring function size, maximum monitored memory size at a time, and total monitored memory size, respectively. We can see that, while most monitoring functions take less than 25 cycles, there are a few applications where monitoring functions take 45-177 cycles. In some cases such as gzip-ML and gzip-COMBO, these relatively expensive monitoring functions occur in applications with frequent triggering accesses. When this happens, the fraction of time with more than 4 microthreads is high, which results in high iWatcher overhead (see FIG. 15).

The last two columns show that in some applications such as gzip-ML and gzip-COMBO, iWatcher needs to monitor many addresses. In this case, the check table will typically contain many entries. Note, however, that even in this case, the size of the monitoring function, which includes the check table lookup, is still not big. This is because the exemplary check table lookup algorithm is very efficient for the applications evaluated in our experiments.

As indicated above, the experiments are performed using Report Mode. In this reaction mode, TLS speeds-up execution by running monitoring-function microthreads in parallel with each other and with the main program. To evaluate the effect of not having TLS, we now repeat the experiments executing both monitoring-function and main-program code sequentially, instead of spawning microthreads to execute them in parallel.

Figure 17:
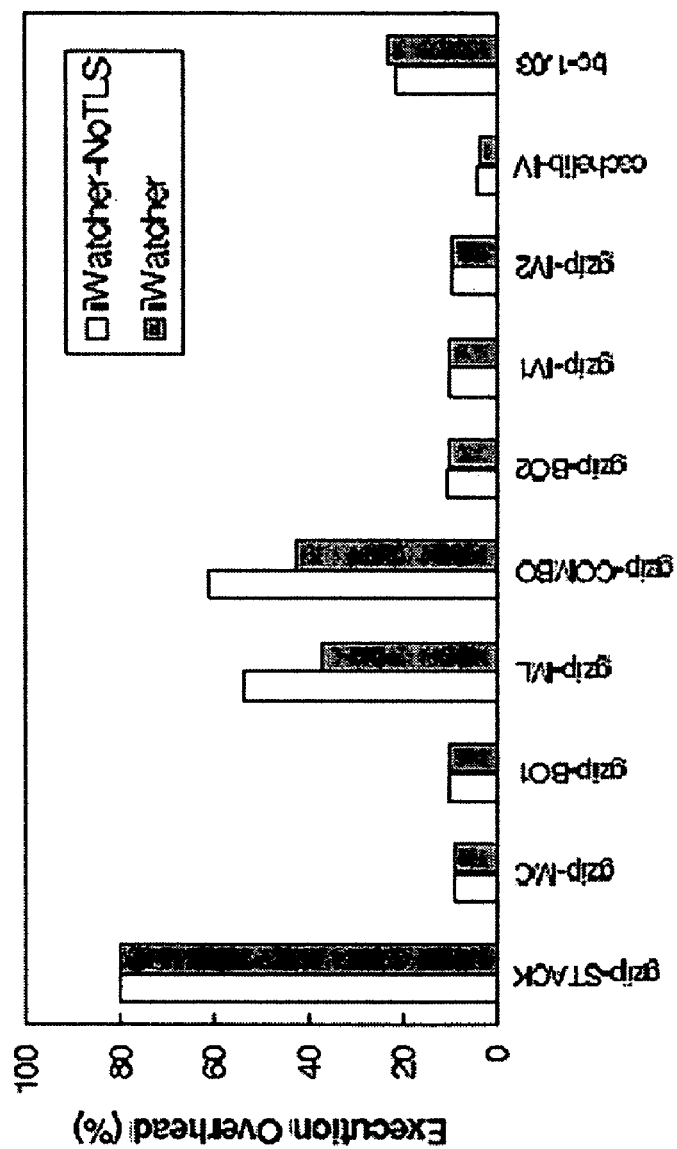
FIG. 17 shows a comparison of an exemplary monitoring and debugging operation, with and without TLS.

FIG. 17 compares the execution overheads of iWatcher and iWatcher without TLS for all the applications. The amount of monitoring overhead that can be hidden by TLS in a program is the product of Columns 4 and 7 in FIG. 16. For programs with substantial monitoring, TLS reduces the overheads. For example, in gzip-COMBO, the overhead of iWatcher without TLS is 61.4%, while it is only 42.7% with TLS. This is a 30% reduction. As monitoring functions perform more sophisticated tasks such as DIDUCE's invariant inference, the benefits of TLS will become more pronounced.

For programs with little monitoring, the product of Columns 4 and 7 in FIG. 16 is small. For these applications, TLS does not provide benefit, because there is not much overhead that can be hidden by TLS. Generally, embodiments employing TLS are preferred, as they reduce the overhead of iWatcher in some applications. Further, TLS can be instrumental in efficiently supporting RollbackMode.

To measure the sensitivity of iWatcher's overhead, we artificially vary the fraction of triggering accesses and the size of the monitoring functions. We perform the experiments on the bug-free gzip and parser applications.

Figure 18:
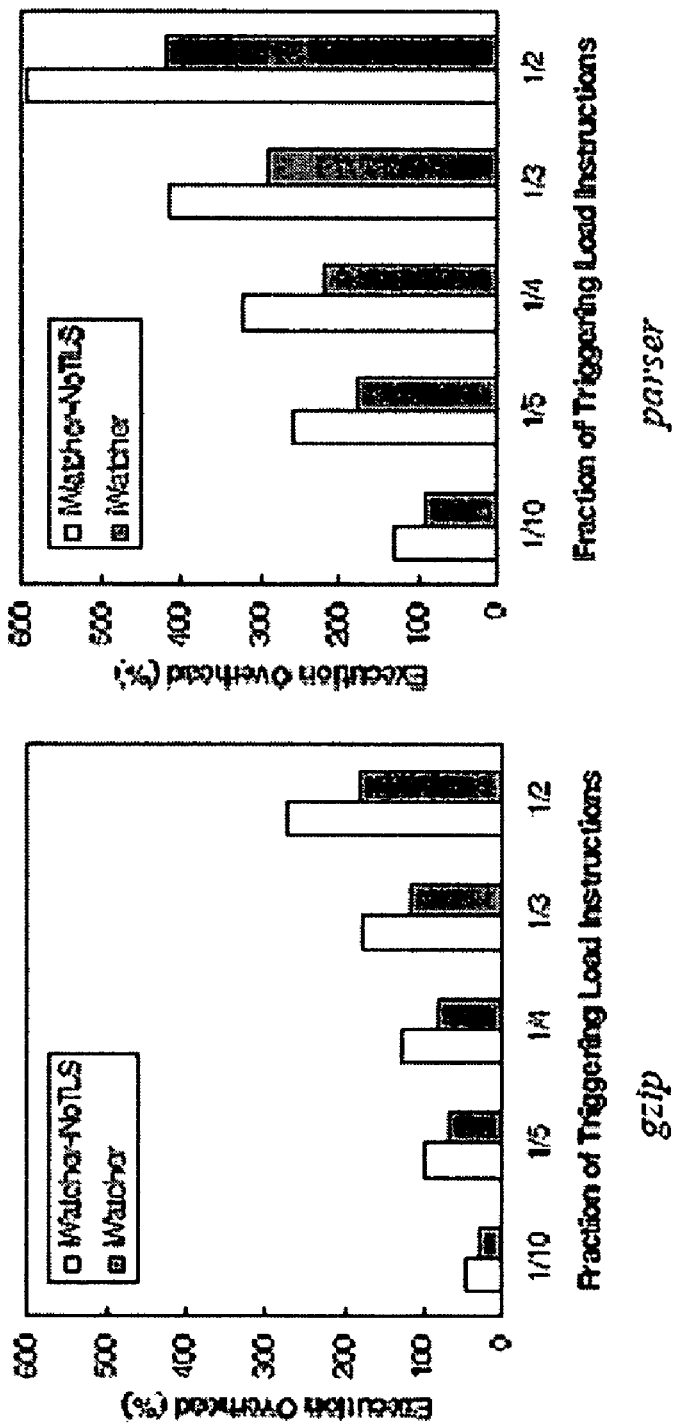
FIG. 18 shows a comparison of an exemplary monitoring and debugging operation, with and without TLS, where the fraction of triggering loads is varied.

In a first experiment, we trigger a monitoring function every Nth dynamic load in the program (for parser, we skip the program's initialization phase, which lasts about 280 million instructions, because its behavior is not representative of steady state), where N varies from 2 to 10. The function walks an array, reading each value and comparing it to a constant for a total of 40 instructions. The resulting execution overhead for iWatcher and iWatcher without TLS is shown in FIG. 18. The figure shows that the overhead of iWatcher with frequent triggering accesses is tolerable. Specifically, the gzip overhead is 66% for 1 trigger out of 5 dynamic loads, and 180% for 1 trigger out of 2 loads. The parser overheads are a bit higher, namely 174% for 1 trigger out of 5 loads, and 418% for 1 trigger out of 2 loads. If iWatcher does not support TLS, however, the overheads go up: 273% for gzip and 593% for parser, respectively, for 1 trigger out of 2 loads.

Figure 19:
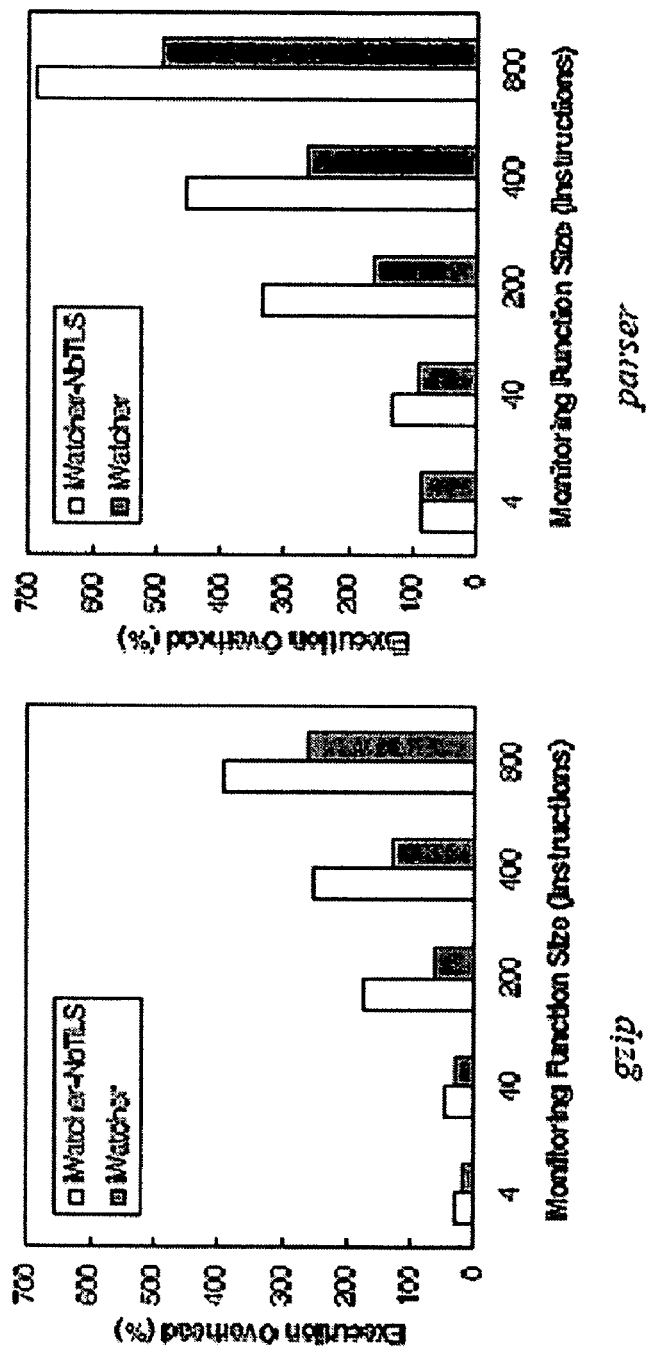
FIG. 19 shows a comparison of an exemplary monitoring and debugging operation, with and without TLS, where the size of the monitoring function is varied.

In a second experiment, we vary the size of the monitoring function. We use the same function as before, except that we vary the number of instructions executed from 4 to 800. The function is triggered in 1 out of 10 dynamic loads. The resulting execution overhead is shown in FIG. 19. The figure again shows that the iWatcher overheads are modest. For 200-instruction monitoring functions, the overhead is 65% for gzip and 159% for parser. In iWatcher without TLS, the overhead is 173% for gzip and 335% for parser. As we increase the monitoring function size, the absolute benefits of TLS increase, as TLS can hide more monitoring overhead.

It will be appreciated that exemplary systems and methods for memory monitoring have been shown and described, having various advantages and benefits. An advantage of preferred embodiments is that they provide location-controlled monitoring (LCM), as opposed to code-controlled monitoring (CCM). Therefore, all accesses to a watched memory location are monitored, including "disguised" accesses due to dangling pointers or wrong pointer manipulations.

Another advantage is low overhead. Preferred systems and methods only monitor memory operations that truly access a watched memory location. Moreover, a preferred architecture uses hardware to trigger monitoring functions with minimal overhead. Further, embodiments using TLS to execute monitoring functions in parallel with the rest of the program effectively hide most of the monitoring overhead.

Preferred embodiments are flexible and extensible. Programmers or automatic instrumentation tools can add monitoring functions. Preferred systems are convenient even for manual instrumentation, because programmers need not instrument every possible access to a watched memory location. Instead, they only need to insert an iWatcherOn( ) call for a location when they are interested in monitoring this location and an iWatcherOff( ) call when the monitoring is no longer needed. In between, all possible accesses to this location are automatically monitored. Further, preferred systems support multiple reaction modes, giving flexibility to the system.

A preferred system is cross-module and cross-developer. A watched location inserted by one module or one developer is automatically honored by all modules and all developers whenever the watched location is accessed.

Preferred systems are also language independent, since they are supported directly in hardware. Programs written in any language, including C/C++, Java, or other languages may use preferred systems. For the same reason, preferred systems can also support dynamic monitoring of low-level system software, including the operating system. Preferred systems are also capable of working in combination with other dynamic checkers, such as DIDUCE.

A system may be used to detect illegal accesses to a memory location. For example, the system may be used for security checks to prevent illegal accesses to some secured memory locations. As a more particular example, an exemplary system has been used by the present inventors to detect stack-smashing attacks.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A hardware architecture for monitoring memory, comprising:
    flag means for detecting triggering accesses at small memory regions;
    table means for detecting triggering accesses at large memory regions; and
    common entry point means for acting as a gateway for monitoring function;
    wherein said flag means comprises at least two bits stored in a cache memory for each of one or more small memory regions stored in the cache memory, the bits indicating, for each of the small memory regions, whether a read access is a triggering access and/or whether a write access is a triggering access;
    wherein the hardware architecture further comprises:
    a table storing, for each of one or more small memory regions that has been previously cleared from the cache memory, an address of the small memory region and bits indicating whether a read and/or write access of the small memory region is a triggering access.

2. The architecture of claim 1, wherein said flag means further comprises:
    trigger means within a processor indicating whether a triggering access has occurred for a particular small memory region, said trigger means being set after a read or write and before a reorder buffer (ROB) is reached;
    storage for one or more watchflags in a load/storage queue.

3. The architecture of claim 2, wherein said trigger means comprises at least one trigger bit that augments a ROB entry.

4. The architecture of claim 1, wherein said table means comprises an associative table, the associative table listing memory addresses for one or more large memory regions, the associative table indicating, for each large memory region, whether a read access is a triggering access and/or whether a write access is a triggering access.

5. The architecture of claim 1, wherein said common entry point means comprises a register storing an address of a software check function, wherein the cheek function determines at least one monitoring function associated with a memory region for which there has been a triggering access.

6. The architecture of claim 1, further comprising:
    means for implementing thread-level speculation (TLS).

7. The architecture of claim 1, wherein the triggering access comprises at least one of a load access and a store access.

8. A support system for monitoring memory, comprising:
    at least one detector for detector a triggering access at one or more monitored memory regions;
    means for determining a monitoring function associated with a memory region for which there has been a triggering access;
    common entry point means for accessing said means for determining a monitoring function;
    wherein said at least one detector and said common entry point means are provided in hardware, and wherein said means for determining a monitoring function is provided in software;
    wherein said at least one detector comprises:
    a plurality of bits stored in a cache with a monitored small memory region, said plurality of bits indicating whether a read and/or write access of the monitored small memory region is a triggering access; and
    an associative table comprising, for each of one or more monitored large memory regions, at least one field identifying a location of the monitored large memory region and a plurality of bits indicating whether a read and/or write access of the monitored large memory region is a triggering access;
    wherein the support system further comprises:
    a table storing, for each of one or more small memory regions that has been previously cleared from the cache, an address of the one or more small memory regions and bits indicating whether a read and/or write access of the one or more small memory regions is a triggering access.

9. The system of claim 8, further comprising:
a software function for associating one or more monitored memory regions with a monitoring function; and
a software function for setting at least one of the plurality of bits stored in a cache and the plurality of bits in the associative table to indicate monitoring of the one or more monitored memory regions.

10. The system of claim 9, further comprising:
a software function for setting at least one of the plurality of bits stored in a cache and the plurality of bits in the associative table to indicate that the one or more monitored memory regions are no longer being monitored.

11. The system of claim 8, wherein said at least one detector further comprises:
at least one trigger bit indicating whether a triggering access has occurred for the monitored small memory region, said at least one trigger bit being set after a read or write and before a reorder buffer (ROB) is reached;
storage for one or more bits in a load/storage queue, each of the one or more bits indicating whether a read and/or write access of the monitored small memory region is a triggering access.

12. The system of claim 8, wherein said common entry point means comprises a register storing an address of said means for determining a monitoring function.

13. The system of claim 12, further comprising:
a software function for storing the address of said means for determining a monitoring function in the register.

14. The system of claim 8, wherein said means for determining a monitoring function comprises a function for checking a table, the table associating each of the one or more monitored memory regions with one or more monitoring functions.

15. The system of claim 8, further comprising:
means for executing a monitoring function determined by said means for determining a monitoring function;
wherein the hardware is capable of thread-level speculation (TLS).

16. A method for memory monitoring comprising:
detecting a triggering access at one or more monitored memory regions;
accessing a function for determining a monitoring function when a triggering access is detected; and
automatically determining a monitoring function associated with the one or more monitored memory regions;
wherein said detecting a triggering access comprises:
receiving one or more parameters;
loading a monitored small memory region into cache memory to create a cache entry;
setting a plurality of bits in the cache memory based on the one or more parameters, the set bits indicating whether a load and/or a store access of the monitored small memory region is a triggering access; and
during a load or store of the monitored small memory region, determining whether the set bits indicate that the load or store is a triggering access based on the set bits;
wherein said detecting a triggering access further comprises:
when the monitored small memory region is cleared from the cache memory, storing, in an associative table in hardware, an address of the monitored small memory region and a plurality of bits indicating whether a load and/or a store access of the monitored small memory region is a triggering access.

17. The method of claim 16, wherein said accessing a function is performed without accessing an operating system.

18. The method of claim 17, wherein said accessing a function is performed without accessing an intermediate program in software.

19. The method of claim 18, wherein said setting a plurality of bits further comprises:
accessing the associative table to read in the stored bits for the monitored small memory region;
setting the plurality of bits in the cache memory based on the read-in stored bits and the one or more parameters.

20. The method of claim 18, wherein said setting a plurality of bits further comprises:
determining whether a cache entry has been created for the monitored small memory region;
if a cache entry has been created, setting the plurality of bits based on the created cache entry and the one or more parameters.

21. A method for memory monitoring comprising:
detecting a triggering access at one or more monitored memory regions;
accessing a function for determining a monitoring function when a triggering access is detected; and
automatically determining a monitoring function associated with the one or more monitored memory regions;
wherein said detecting a triggering access comprises:
receiving one or more parameters;
loading a monitored small memory region into cache memory to create a cache entry;
setting a plurality of bits in the cache memory based on the one or more parameters, the set bits indicating whether a load and/or a store access of the monitored small memory region is a triggering access; and
during a load or store of the monitored small memory region, determining whether the set bits indicate that the load or store is a triggering access based on the set bits;
wherein said determining whether the set bits indicate that the load or store is a triggering access comprises:
reading the set bits into a storage within a load/storage queue;
during a load of the monitored small memory region, if the set bits indicate a triggering access, setting a trigger bit associated with a reorder buffer (ROB) entry for the monitored small memory region;
when the load reaches the head of the ROB, checking the trigger bit to determine if the load is a triggering access.

22. The method of claim 21, further comprising:
based on one or more parameters, resetting the plurality of bits to indicate that at least one of a load and a store of the monitored small memory region is not a triggering access.

23. The method of claim 21, wherein said detecting a triggering access further comprises:
allocating an entry in an associative table in hardware according to the one or more parameters, wherein the entry comprises a location of a monitored large memory region and a plurality of bits indicating whether a load and/or a store access of the monitored large memory region is a triggering access;
during a load or store of the monitored large memory region, reading the allocated entry to determine whether the load or store is a triggering access.

24. A method for memory monitoring comprising:
detecting a triggering access at one or more monitored memory regions;
accessing a function for determining a monitoring function when a triggering access is detected; and automatically determining a monitoring function associated with the one or more monitored memory regions;
wherein said detecting a triggering access comprises:
receiving one or more parameters;
loading a monitored small memory region into cache memory to create a cache entry;
setting a plurality of bits in the cache memory based on the one or more parameters, the set bits indicating whether a load and/or a store access of the monitored small memory region is a triggering access; and
during a load or store of the monitored small memory region, determining whether the set bits indicate that the load or store is a triggering access based on the set bits;
wherein said detecting a triggering access further comprises:
allocating an entry in an associative table in hardware according to the one or more parameters, wherein the entry comprises a location of a monitored large memory region and a plurality of bits indicating whether a load and/or a store access of the monitored large memory region is a triggering access; and
during a load or store of the monitored large memory region, reading the allocated entry to determine whether the load or store is a triggering access;
wherein said determining whether the set bits indicate that the load or store is a triggering access comprises:
issuing a prefetch to a memory system;
reading data into the cache memory;
reading the set bits into a storage within the load/storage queue;
if either the set bits or the associative table indicates a triggering access, setting a trigger bit associated with a reorder buffer (ROB) entry;
when a store instruction reaches a head of the ROB, checking the trigger bit to determine if a store is a triggering access.

25. The method of claim 24, wherein said detecting a triggering access further comprises:
determining whether the monitored memory region is a monitored small memory region or a monitored large memory region based on a predetermined parameter.

26. A method for memory monitoring comprising:
detecting a triggering access at one or more monitored memory regions;
accessing a function for determining a monitoring function when a triggering access is detected; and
automatically determining a monitoring function associated with the one or more monitored memory regions;
wherein said detecting a triggering access comprises:
receiving one or more parameters;
loading a monitored small memory region into cache memory to create a cache entry;
setting a plurality of bits in the cache memory based on the one or more parameters, the set bits indicating whether a load and/or a store access of the monitored small memory region is a triggering access; and
during a load or store of the monitored small memory region, determining whether the set bits indicate that the load or store is a triggering access based on the set bits;
wherein said detecting a triggering access further comprises:
allocating an entry in an associative table in hardware according to the one or more parameters, wherein the entry comprises a location of a monitored large memory region and a plurality of bits indicating whether a load and/or a store access of the monitored large memory region is a triggering access; and
during a load or store of the monitored large memory region, reading the allocated entry to determine whether the load or store is a triggering access;
wherein said allocating an entry further comprises:
if an already-allocated entry exists for the monitored large memory region, setting the plurality of bits in the already-allocated entry based on previously-set bits in the already-allocated entry and the one or more parameters.

27. The method of claim 26, wherein said automatically determining a monitoring function comprises:
reading an entry in an associative table in software, wherein the entry comprises a location of a monitored memory region and at least one monitoring function associated with the monitored memory region.

28. The method of claim 27, wherein said accessing a function comprises:
pointing to a location of a check function in software, wherein the check function reads the entry in the associative table in software.

29. The method of claim 18, further comprising:
executing the determined monitoring function.

30. The method of claim 29, further comprising:
if the monitoring function fails, reporting the outcome of the executed monitoring function.

31. The method of claim 29, wherein said executing the determined monitoring function is performed in parallel with executing a main program causing the detected triggering access.

32. The method of claim 31, further comprising:
if the executed monitoring function fails, continuing to execute the main program.

33. The method of claim 31, further comprising:
if the executed monitoring function fails, pausing the main program at the detected triggering access and passing control of the main program to one of an exception handler and a debugger.

34. The method of claim 31, further comprising:
if the executed monitoring function fails, rolling back execution of the main program to a most recent checkpoint, and continuing to execute the main program.

* * * * *

UNITED STATES PATENT AND TRADEMARK OFFICE
CERTIFICATE OF CORRECTION

| | | |
|---|---|---|
| PATENT NO. | : 7,711,988 B2 | Page 1 of 1 |
| APPLICATION NO. | : 11/453303 | |
| DATED | : May 4, 2010 | |
| INVENTOR(S) | : Zhou et al. | |

It is certified that error appears in the above-identified patent and that said Letters Patent is hereby corrected as shown below:

Col. 24, line 6
    delete "18" and insert --16-- therefor.

Col. 24, line 12
    delete "18" and insert --16-- therefor.

Col. 26, line 34
    delete "18" and insert --16-- therefor.

Signed and Sealed this

Nineteenth Day of October, 2010

David J. Kappos
*Director of the United States Patent and Trademark Office*